United States Patent [19]
Sato et al.

[11] Patent Number: 6,100,960
[45] Date of Patent: Aug. 8, 2000

[54] FILM SCANNER

[75] Inventors: Hidekage Sato, Kawasaki; Takashi Amikura, Yokohama, both of Japan

[73] Assignee: Canon Kabushiki Kaisha, Tokyo, Japan

[21] Appl. No.: 08/892,133

[22] Filed: Jul. 14, 1997

[30] Foreign Application Priority Data

Jul. 16, 1996 [JP] Japan ................................. 8-186212

[51] Int. Cl.⁷ .......................... G03B 29/00; G03B 27/52; H04N 1/27
[52] U.S. Cl. ............................. 355/40; 355/18; 396/311; 358/527; 358/506
[58] Field of Search .................................. 358/527, 506, 358/474, 486, 487, 488, 496; 396/311, 319, 429; 348/96, 97; 355/18, 40, 41

[56] References Cited

U.S. PATENT DOCUMENTS

| | | | |
|---|---|---|---|
| 5,570,302 | 10/1996 | Kobayashi et al. | 364/561 |
| 5,652,643 | 7/1997 | Saito et al. | 396/311 |
| 5,748,183 | 5/1998 | Yoshimura et al. | 348/744 |
| 5,754,221 | 5/1998 | Nishimura et al. | 348/97 |
| 5,768,444 | 6/1998 | Nishimura | 358/527 |
| 5,883,698 | 3/1999 | Kimura | 396/311 |

*Primary Examiner*—Alan A. Mathews
*Attorney, Agent, or Firm*—Fitzaptrick, Cella, Harper & Scinto

[57] ABSTRACT

A film scanner is capable of reading an image formed on a film in accordance with a photographing mode recorded in each frame of the film. In this film scanner, an image formed in each frame of a film held by a film holder is projected onto a linear image sensor by a focusing optical system to read the image with the linear image sensor. A magnetic information detection unit detects magnetic information recorded in each frame of the film, and a system controller identifies a photographing mode of each frame of the film. In accordance with the identified photographing mode, an image read area of each frame is set and a subscanning motor is driven in accordance with this image read area. The subscanning motor is driven in the area outside of the image read area at a faster speed than in the image read area. Therefore, a read time can be shortened as compared to the case wherein all frames are read in the broadest image read area. Trimming works can be omitted.

25 Claims, 25 Drawing Sheets

DIGITAL BLACK LEVEL CORRECTION

AGC

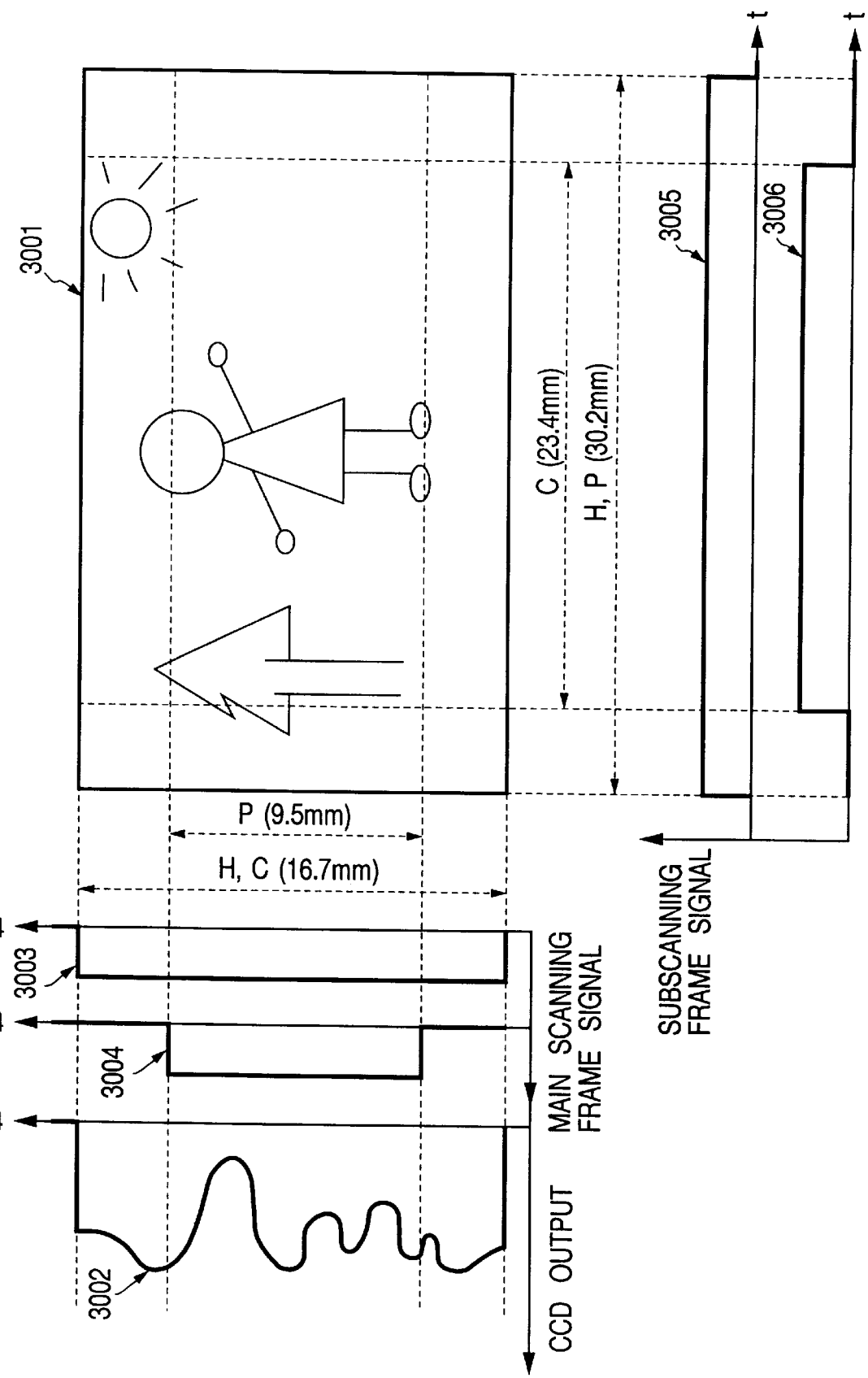

FILM SCANNER

BACKGROUND OF THE INVENTION

1. Field of the Invention

The present invention relates to a film scanner capable of reading an image on an advanced photo system (APS) film having a new film format, or images on other types of films.

2. Related Background Art

Conventional film scanners for inputting film images to a personal computer have been developed mainly for 35 mm films (also called "135 film"). In reading an image with a scanner, a film scanner is first operated at low resolution and at high speed and the whole image is once displayed (previewed) on a personal computer. Thereafter, a read area in the preview is designated, and the image in this read area is newly read by the film scanner to be sent to the personal computer.

A conventional film scanner will be described with reference to FIG. 28 showing the structure thereof.

Reference numeral 2801 represents a light source. Reference numeral 2802 represents a film holder for holding a film or transparent original, the film holder being movable in the Y-direction as indicated in FIG. 28. Reference numeral 2803 represents a focussing lens system, and reference numeral 2804 represents a CCD linear image sensor (also called a CCD linear sensor and called hereinafter a linear image sensor). The longitudinal direction of the linear image sensor 2804 is disposed along the X-direction as indicated in FIG. 28. With the above position relation, the main scan direction along the longitudinal direction of the linear image sensor 2804 is perpendicular to the sub scan direction along the motion direction of the film folder 2802. A color image may be read in various ways with the following relations between the light source 2801 and linear image sensor 2804.

|    | Light source              | CCD     | Read              |
|----|---------------------------|---------|-------------------|
| a) | White color               | 3 lines | Simultaneous RGB  |
| b) | Three colors (RGB emission) | 1 line  | RGB Time-division |
| c) | White color (RGB filters) | 1 line  | RGB Time-division |

Each of these methods has merits and demerits and is tried to be properly selected. In the following, the above combination a) will be described.

Reference numeral 2805 represents an analog image processing circuit which executes gain setting and clamping of an analog image signal output from the linear image sensor 2804. Reference numeral 2806 represents an A/D converter for converting an analog signal into a digital signal. Reference numeral 2807 represents an image processing unit composed of gate arrays which can execute at high speed various processes including image processing and CCD drive pulse processing. Reference numeral 2808 represents a line buffer for temporarily storing image data. Reference numeral 2809 represents an interface unit used for communications with external equipment 2810 such as a personal computer. Reference numeral 2811 represents a system controller in which the whole sequence of the film scanner is stored, the system controller executing various operations in accordance with instructions from the external equipment 2810. Reference numeral 2812 represents a CPU bus for the interconnection among the system controller 2811, image processing unit 2807, line buffer 2808 and interface unit 2809, the CPU bus being composed of an address bus and a data bus.

Reference numeral 2813 represents a subscanning motor for moving the film holder 2802 in the sub scan direction, this motor being a stepping motor in this example. Reference numeral 2814 represents a subscanning motor driver for driving the subscanning motor 2813 in response to an instruction from the system controller 2811. Reference numeral 2815 represents a subscanning position detection unit for detecting a reference position of the sub scan, this unit being a photo interrupter which detects a projection formed on the film folder 2802. Reference numeral 2816 represents a light source turn-on circuit for turning on the light source 2801.

The conventional film scanner has been constructed as above. Image data is input to the external equipment 2810 such as a personal computer through communications between software (hereinafter called firmware) embedded in the system controller 2811 and software (hereinafter called driver software) for operating the film scanner from the external equipment 2810 such as a personal computer.

This image data transfer process will be briefly described with reference to the flow chart shown in FIG. 29. It is assumed now that the file scanner and the external equipment 2810 have their power turned on already and that under the running state of firmware and driver software, a user has inserted a film into a predetermined location.

At Step S2901, the user enters a preview instruction from the external equipment 2810. Then, the external equipment 2810 transmits, to the firmware side, designated information including a film type, a read area (all screen in this case) and a read resolution (low resolution in this case).

At Step S2902, the firmware sets the designated information including the film type, read area and read resolution for the preparation of succeeding operations.

At Step S2903, the system controller 2811 reads information on the subscanning position detection unit 2815, and controls the subscanning motor 2813 to move the film to an initial position.

At Step S2904, the system controller 2811 issues a light source turn-on instruction to the light source turn-on circuit 2816 to turn the light source 2801 on.

At Step S2905, the system controller 2811 issues an instruction for outputting timing pulses (such as CCD drive pulse and RAM address control pulse) in order to read one line data.

At Step S2906, image data of each line is read during a predetermined exposure time and the subscanning motor 2813 is driven at a predetermined speed. Thereafter, the image processing unit 2807 performs image processing to output image data to the external equipment 2810.

If the image read area has been fully scanned at Step S2907, the system controller 2811 drives the subscanning motor 2813 to restore the initial position. The light source 2801 is turned off, and all functions of the film scanner are stopped.

At Step S2908, the firmware of the system controller 2811 enters a routine of waiting for the next command.

At Step S2909, the external equipment 2810 receives the image data, and sequentially displays it to show the user the whole film image.

At Step S2910, after viewing the preview image data, the user again sets image fetching conditions to instruct a next substantial or main scan. Similar to Step S2901, information designated by the user, including the film type, read area (area designated by the user in this case) and/read resolution (resolution designated by the user in this case), is transmitted to the firmware side.

At Step S2911, the firmware of the system controller 2811 receives the read conditions, and the operations from Step S2902 to Step S2908 are executed under the substantial or main scan conditions. The image data sent to the external equipment 2810 at Step S2912 is displayed by using the driver software and can be stored in a storage medium (such as a hard disk, a magnetooptical disk and a floppy disk).

With the above conventional techniques, however, three types of photographing modes recorded magnetically on an APS film are not considered at all when reading image information of the APS film. Therefore, the conventional techniques can deal with only one photographing mode of reading the broadest area of a film. Therefore, in a photographing mode of photographing an image in a narrower area of a film frame, a user is required to trim the image read area, or otherwise the image data is possibly read from the broadest area.

SUMMARY OF THE INVENTION

The invention has been made under the above circumstances and aims at providing a film scanner capable of reading an image in a way suitable for a photographing mode recorded on a film such as an APS film.

In order to achieve the above object, according to one aspect of the present invention, there is provided a film scanner for projecting an image to be read onto a linear image sensor, performing electronic main scanning along the longitudinal direction of the linear image sensor and electronic sub scan along a direction perpendicular to the longitudinal direction to read the film image through a relative motion between the film image and the linear image sensor and processing the film image, the film scanner comprising: frame information detection means for detecting frame information recorded on the film; and control means for controlling to change an image read area of the film in accordance with an output of the frame information detection means.

According to another aspect of the invention, the frame information is information magnetically recorded on the film.

According to another aspect of the invention, the control means performs the relative motion in an area outside of the image read area at a faster speed than in the image read area.

According to another aspect of the invention, the control means controls to process image signals only in the image read area.

The other objects and features of the present invention will become apparent from the following detailed description of preferred embodiments and accompanying drawings.

BRIEF DESCRIPTION OF THE DRAWINGS

FIG. 30 is a diagram illustrating a frame signal.

DETAILED DESCRIPTION OF THE PREFERRED EMBODIMENTS

Embodiments of the invention will be described in detail, by taking a film scanner as an example.

The film scanner of the embodiment can read both 35 mm films and APS films. The invention is not limited thereto, but may be embodied so as to read only APS films or other types of films recorded with frame data. In this embodiment, although a film with magnetically recorded frame data is read, the invention is not limited thereto, but may be embodied so as to read optically recorded frame data. Furthermore, although an image on a film is projected via a focussing lens system onto a linear image sensor, the invention is not limited thereto, but may be embodied so as to project an image on a film directly to a linear image sensor of a tight contact type.

Figure 1:
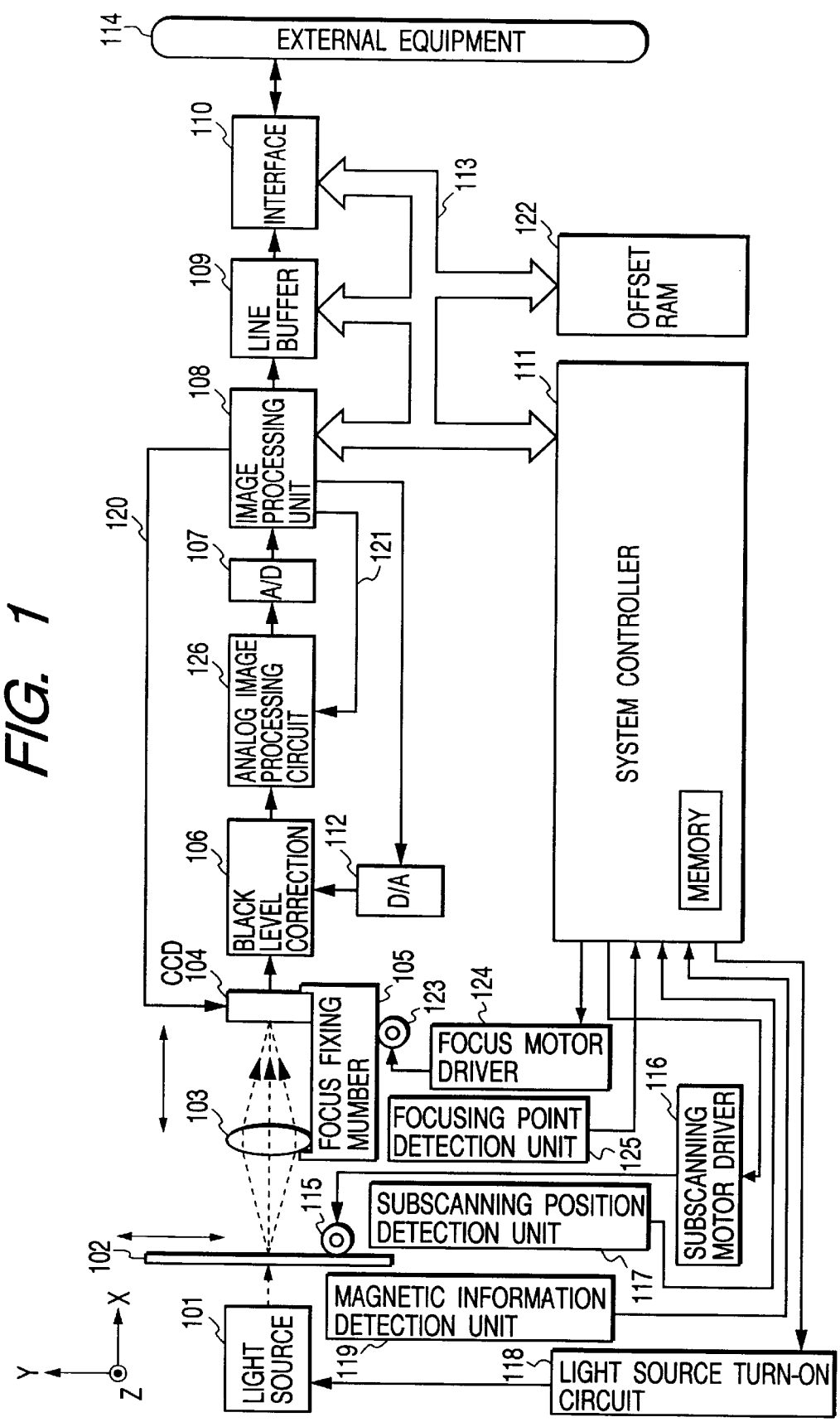
FIG. 1 is a block diagram showing the structure of a film scanner according to an embodiment of the invention.

FIG. 1 is a block diagram showing the structure of a film scanner according to an embodiment of the invention.

First, the structure of the image sensor will be described. Reference numeral 101 represents a light source using a cold cathode tube, and reference numeral 102 represents a film holder for holding a film or transparent original, the film holder being movable in the Y-direction as indicated in FIG. 1. Reference numeral 103 represents a focussing lens system (focussing optical system), and reference numeral 104 represents a CCD linear image sensor (also called a linear image sensor or a CCD). The longitudinal direction of the linear image sensor 104 is disposed along the Z-direction as indicated in FIG. 1. With the above position relation, the main scan direction along the longitudinal direction of the linear image sensor 104 is at a right angle to (perpendicular to) the sub scan direction along the motion direction of the film folder 102. Reference numeral 105 represents a focus fixing member for holding the linear image sensor 104 near at the focus plane of the focussing lens system 103 and moving together with the linear image sensor 104 along the optical axis direction or X-direction as viewed on the drawing sheet. Reference numeral 106 represents a black level correction circuit for adjusting the black level of an analog image signal output from the linear image sensor 104. Reference 126 represents an analog image processing circuit, which performs signal amplification and a multiplexing function. Reference numeral 107 represents an A/D converter for converting an analog signal undergone the analog image processing by the analog image processing circuit 126, into a digital signal. Reference numeral 108 represents an image processing for executing various processes including image processing and CCD drive pulse processing, the image processing unit being composed of gate arrays and being able to execute various processes at high speed. Reference numeral 109 represents a line buffer for temporarily storing image data, the line buffer being formed of a general random access memory. Reference numeral 110 represents an interface unit used for communications with external equipment 114 such as a personal computer. Reference numeral 111 represents a system controller in which the whole sequence of the film scanner is stored in a built-in memory, the system controller executing various operations in accordance with instructions from the external equipment 114. Reference numeral 113 represents a CPU bus for the interconnection among the system controller 111, image processing unit 108, line buffer 109 and interface unit 110, the CPU bus being composed of an address bus and a data bus. Reference numeral 115 represents a subscanning motor for moving the film holder 102 in the sub scan direction, this motor being a stepping motor in this example. Reference numeral 116 represents a subscanning motor driver for driving the subscanning motor 115 in response to an instruction from the system controller 111. Reference numeral 117 represents a subscanning position detection unit for detecting a reference position of the sub scan, this unit being a photo interrupter which detects a projection formed on the film folder 102. Reference numeral 118 represents a light source turn-on circuit for turning on the cold cathode tube 101, this circuit being a so-called inverter circuit. Reference numeral 119 represents a magnetic information detection unit for detecting magnetic information recorded on the surface of an APS film, this unit being a magnetic read head. Reference numeral 120 represents a drive signal for driving the linear image sensor 104. Reference numeral 121 represents a control circuit for controlling the analog image processing circuit 126. Reference numeral 122 represents a RAM used as a working area for image processing, this RAM being called an offset RAM. As will be later described, this offset RAM temporarily stores image data and other various data regarding shading correction, gamma correction, color data synthesizing, and the like. Reference numeral 123 represents a focus motor for moving the focus fixing member 105 along the optical axis direction, reference numeral 124 represents a focus motor driver for supplying a drive signal to the focus motor 123, and reference numeral 125 represents a focus position detection unit for detecting an initial position of the focus fixing member 105.

Figure 2:
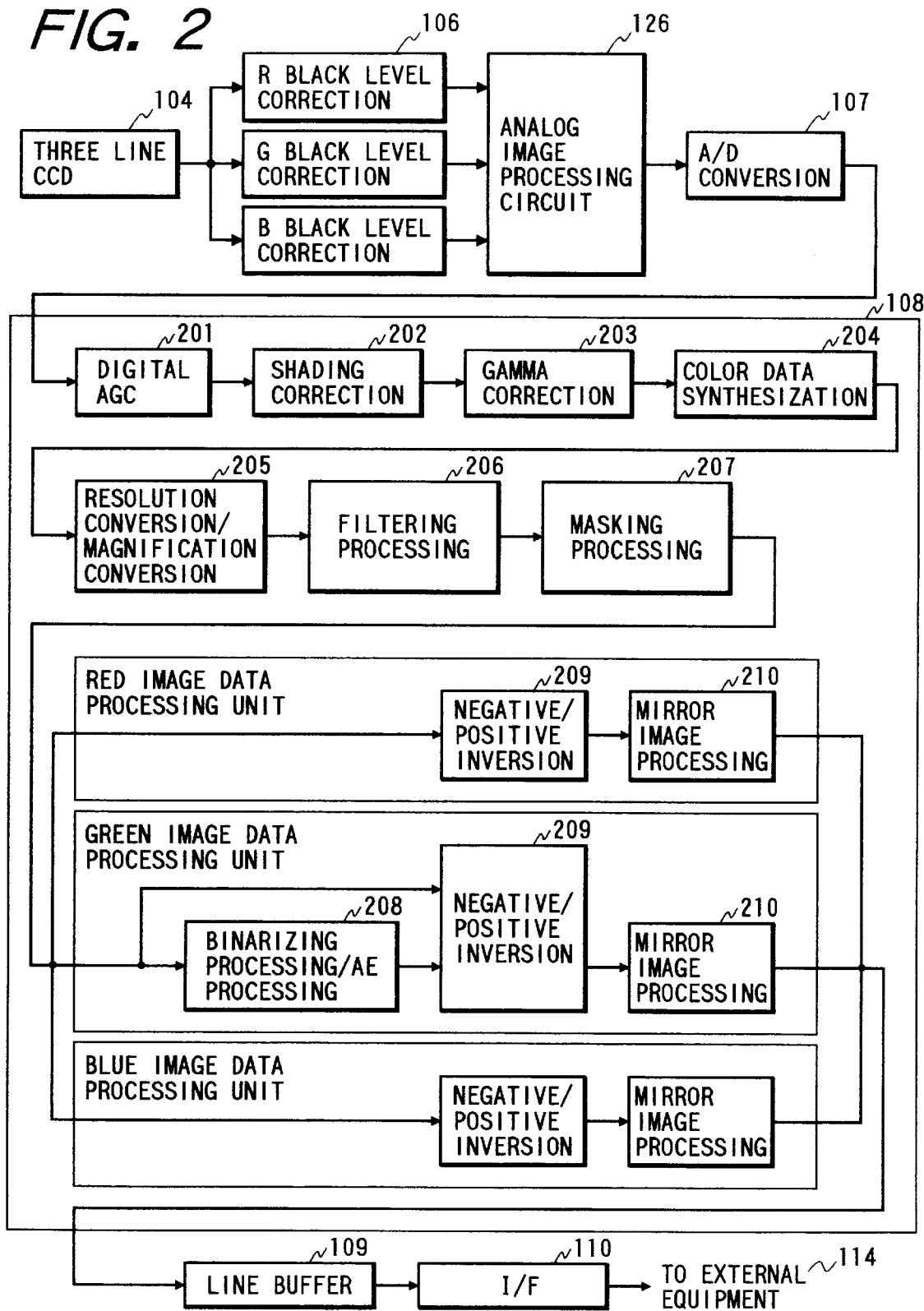
FIG. 2 is a block diagram showing the details of an image processing unit.
Figure 3:
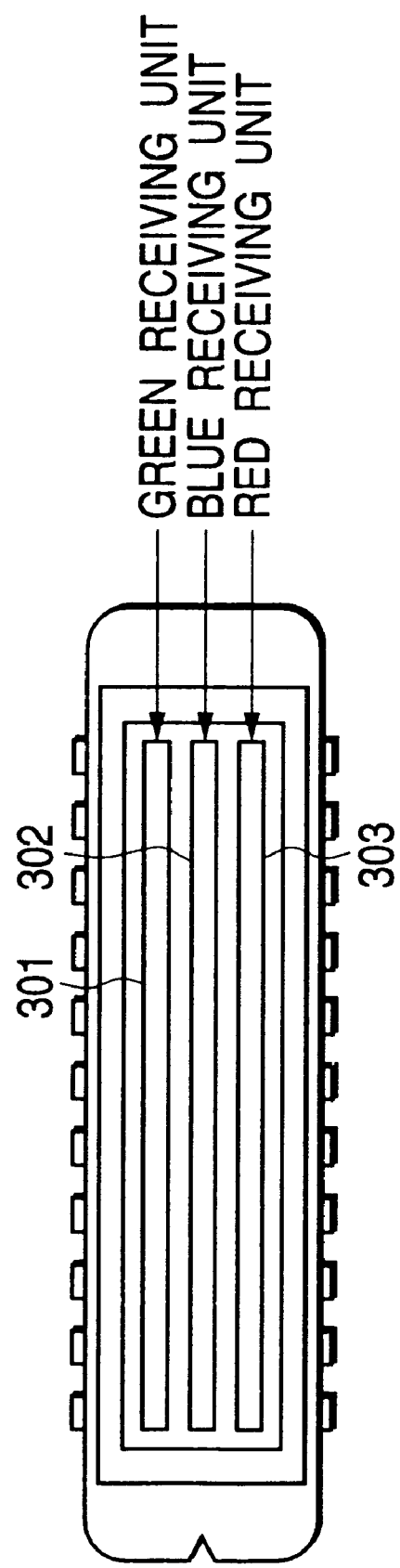
FIG. 3 is a diagram showing a light receiving surface of a linear image sensor.
Figure 4:
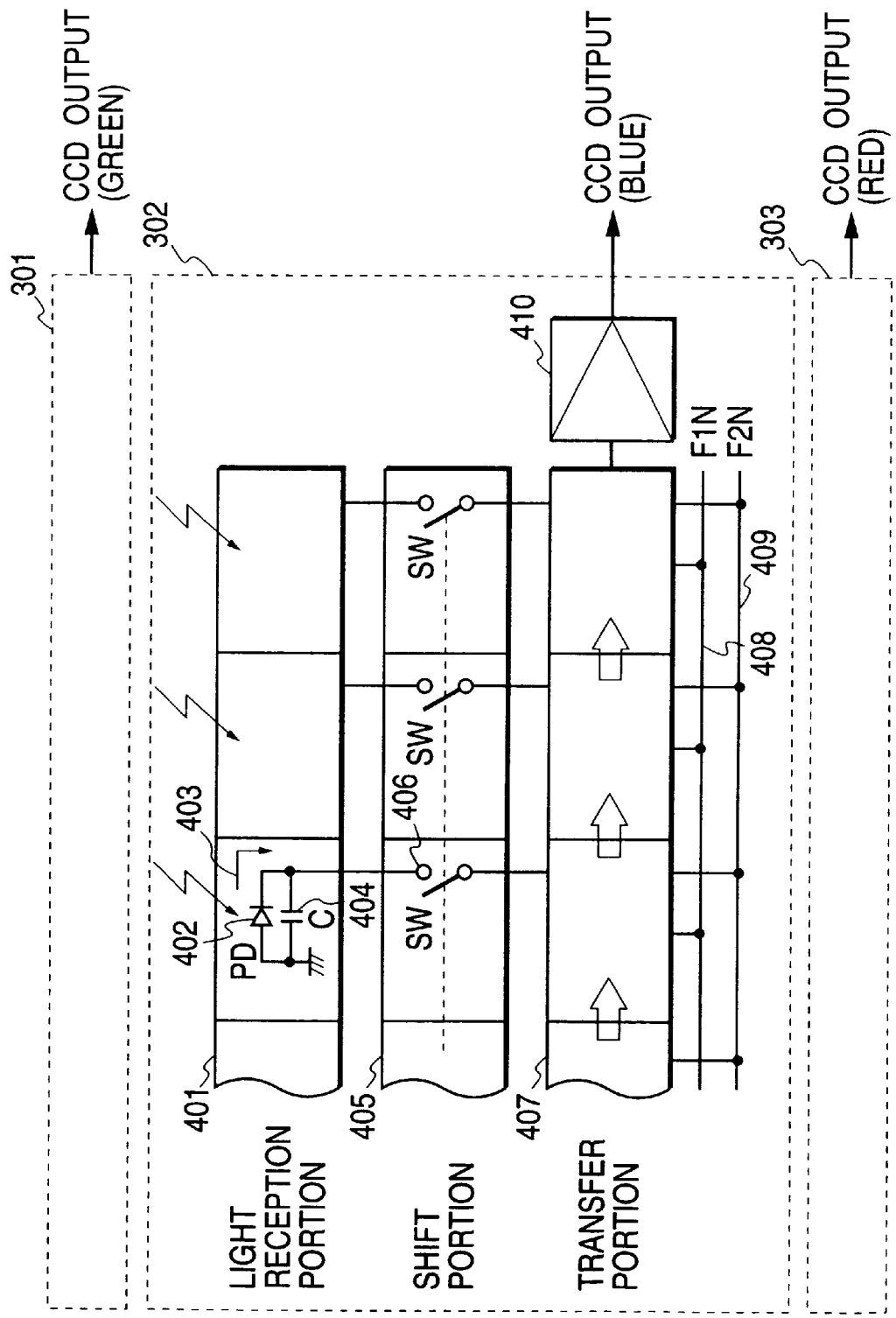
FIG. 4 is a diagram showing the structure of the linear image sensor.

The details of the image processing unit 108 will be described with reference to the detailed diagram thereof shown in FIG. 2. Reference numeral 104 shown in FIG. 2 represents a 3-line linear image sensor whose light receiving surface is shown in FIG. 3. The 3-line image sensor is made of a one-chip photoelectrical conversion element in which each row (three rows in total) of red, green and blue read photosensors of several thousands each several microns square is juxtaposed and a scanning driver circuit is built in. Reference numeral 301 represents a green receiving unit, reference numeral 302 represents a blue receiving unit, and reference numeral 303 represents a red receiving unit, these units being disposed at a predetermined interval. The structure of each receiving unit is shown in FIG. 4 which contains an enlarged view of the blue receiving unit 302 by way of example. As light is incident upon a light reception portion 401, a photodiode 402 generates electric charges proportional to the light amount, and current flows along a direction 403. This current charges a capacitor 404 to accumulate therein electric charges corresponding to the light amount. Charges of all pixels accumulated in the light reception portion 401 are sent at the same time to a transfer portion 407 when all the contacts of switches (SW) 406 of a shift portion 405 close at the same time. The charges sent to the transfer portion 407 are transferred along the main scan direction in response to transfer pulses 408 and 409 having different phases, amplified by an amplifier 410 and output therefrom. The external signal for controlling the switches 406 and external pulse signals 408 and 409 correspond to CCD drive signals 120 shown in FIG. 1 and are output at predetermined timings under the control of the image processing unit 108.

Figure 5:
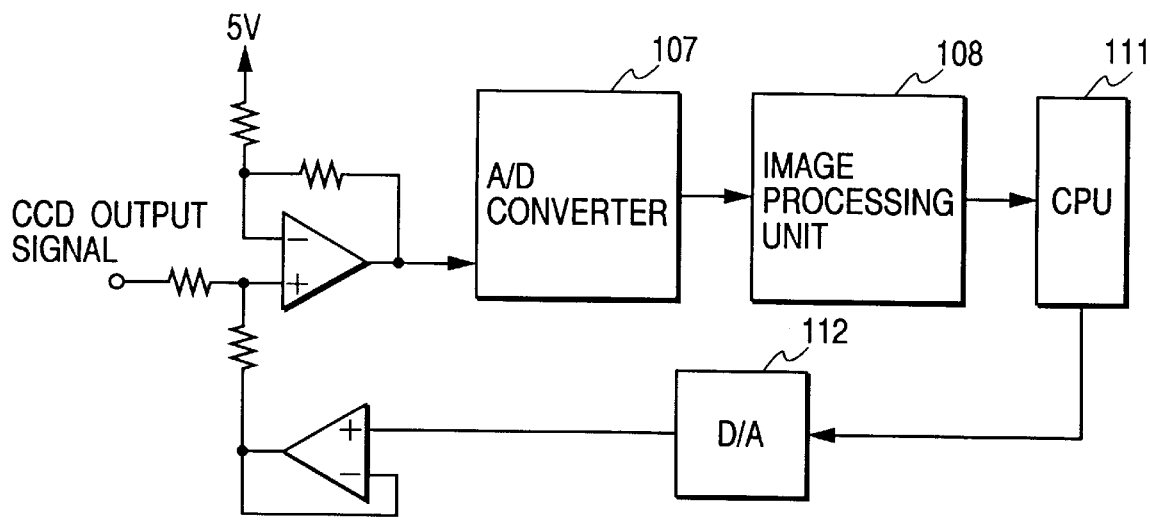
FIG. 5 is a block diagram showing a black level correction circuit.

The amplified output signal of CCD 104 is still unstable with respect to its reference level. Therefore, this amplified output signal of CCD 104 is supplied to the black level correction circuits 106 which stabilizes the black level of an image by suppressing the maximum value of an input signal to the A/D converter 107 to 5 V. FIG. 5 illustrates how the black level is adjusted. However, it should be noted that in FIG. 5, the analog image processing circuit is omitted to simplify the explanation. A CPU of the system controller 111 monitors a voltage input to the A/D converter 107. If voltage higher than 5 V is input to the A/D converter 107, CPU of the system controller 111 generates, in accordance with the A/D converted image data, data for suppressing the image signal to 5 V or lower. This generated data is converted by the D/A converter 112 into an analog signal which is added to the image signal. With these operations, the voltage input to the A/D converter 107 is lowered to stabilize the black level.

Figure 6:
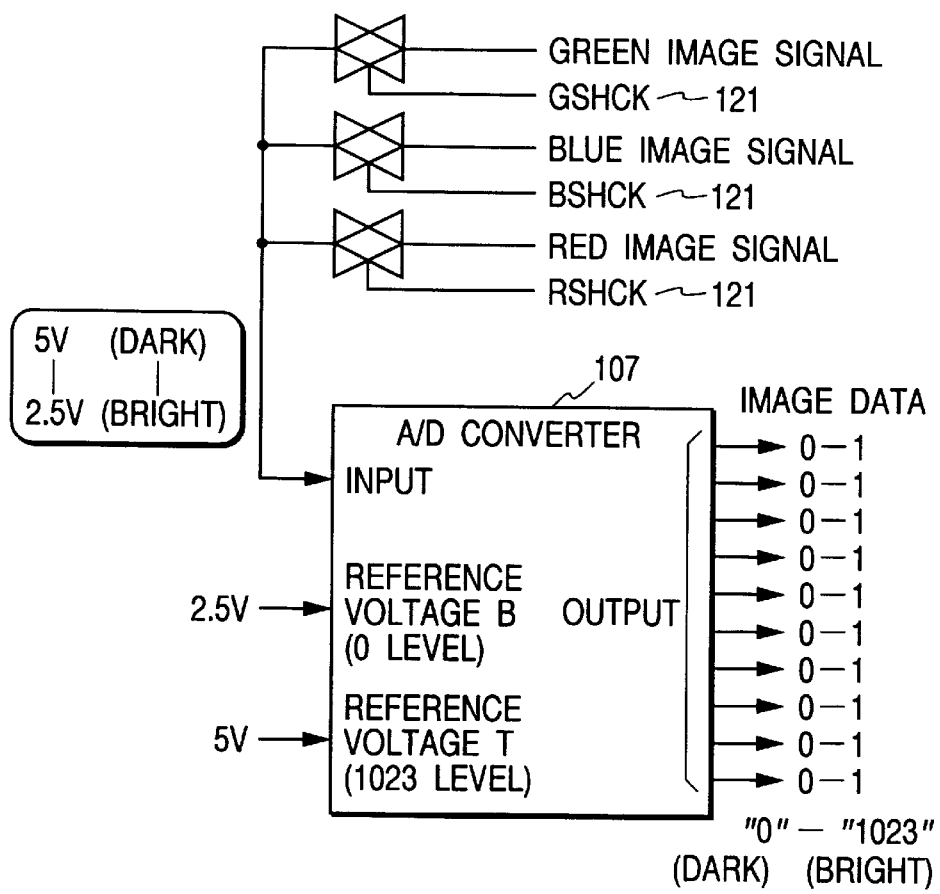
FIG. 6 is a diagram showing an A/D converter.

In the analog image processing circuit 126, black-level corrected image signal (analog signal) is amplified by analog amplifiers provided separtely for R, G and B and then time divided by a multiplexing circuit to be output. The amplification factor of the analog amplifier is transmitted, as the analog image processing circuit control signal 121, from the system controller 111 through the CPU bus 113 and the image processing unit 108, wherein the control signal 121 includes RSHCK, GSHCK and BSHCK signals. The image signal which is time divided in the order of red, green and blue image signals, is converted into 10-bit image data (digital data) by the A/D converter 107, as shown in FIG. 6. A reference voltage T terminal and a reference voltage B terminal of the A/D converter 107 are applied with +5 V and a reference voltage (in this example, 2.5 V), respectively. The A/D converter 107 outputs "0" when the input signal is 5 V, and outputs "1023" when the input signal is the reference voltage (2.5 V).

Figure 7A:
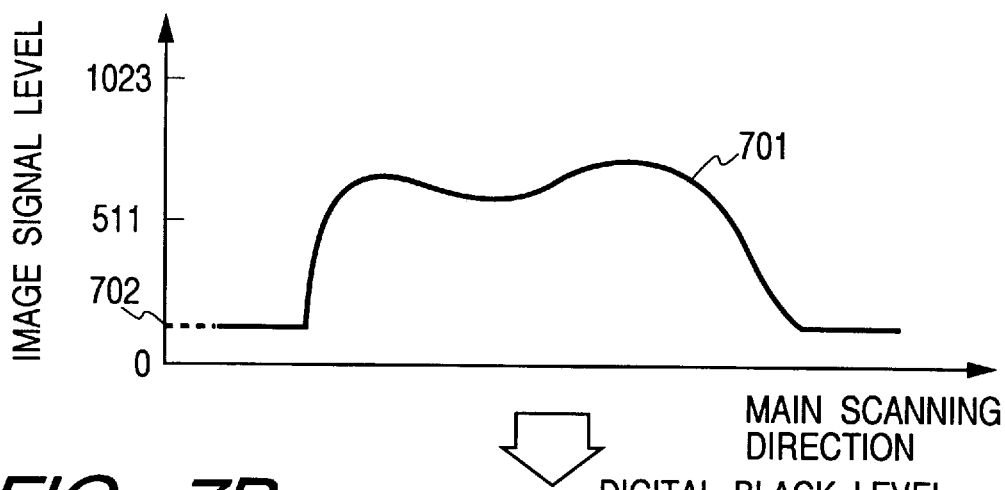
FIGS. 7A, 7B and 7C are graphs illustrating gamma correction.
Figure 7B:
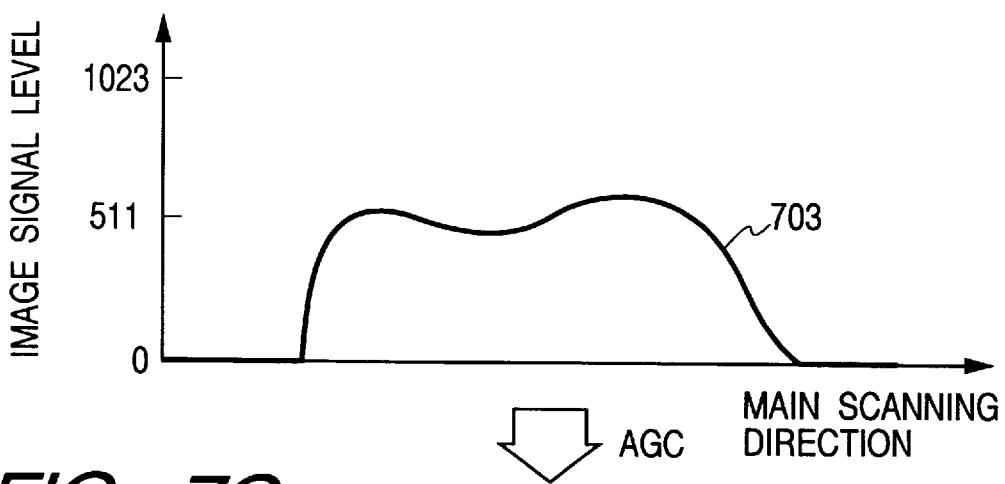
Figure 7C:
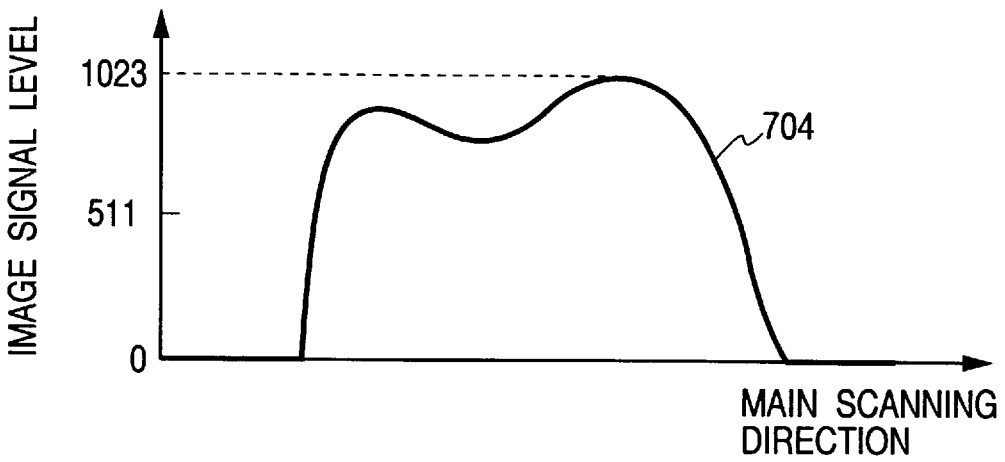

This digital image data is processed by the image processing unit 108. In the image processing unit 108, reference numeral 201 represents a digital auto gain control (AGC) circuit to balance respective color image data in the manner illustrated in FIGS. 7A to 7C. First, the image signal whose black level was stabilized by the black level correction unit 106 is further subjected to a digital black level correction. This correction is achieved by subtracting a pixel value corresponding to an optical black 702 output from CCD, from the total image data 701. Reference numeral 703 represents image data after the digital black level correction. Image data of each color is multiplied by up to 2 times to balance each color. Reference numeral 704 represents an image signal of one color obtained from the image data 703 whose maximum value was set to "1023" through AGC.

Figure 8:
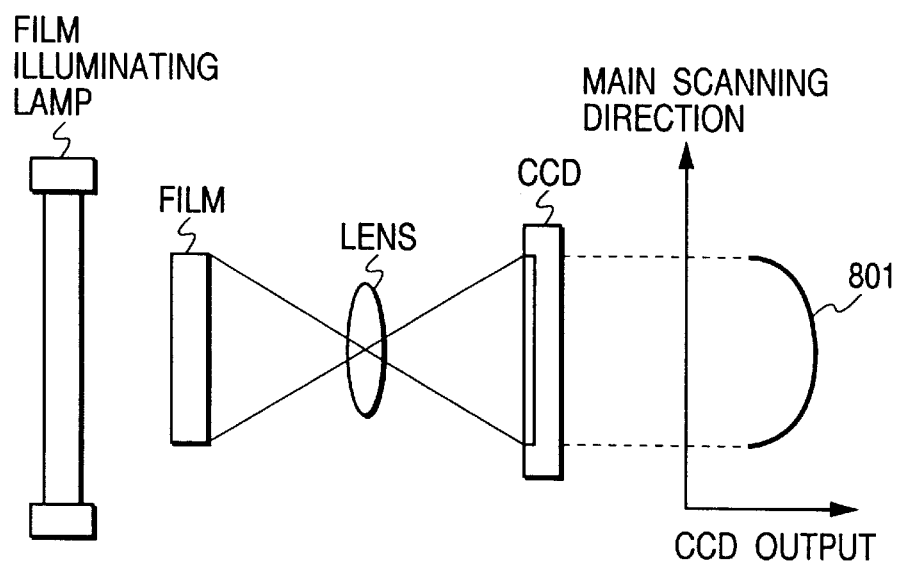
FIG. 8 is a diagram illustrating shading correction.

Reference numeral 202 represents a shading correction circuit. As shown in FIG. 8, if nothing is interposed in front of the film surface, image signals for respective pixels output from the linear image sensor 104 do not take uniform values because of the following reasons:

(1) Light amount of a film illumination lamp is higher at the central area thereof than at the opposite end areas.

(2) Light transmission amount through a lens is higher at the central area thereof than at the peripheral area.

(3) Sensitivities of respective light receiving elements of the linear image sensor 104 are not uniform.

From the above reasons, an output image signal is supposed to be a curve 108 such as shown in FIG. 8 at the right side portion thereof. Correcting (flattening) this irregular level is shading correction. In this example, before a film is inserted, the red, green and blue light receiving elements read the light intensity distribution on the focus plane along the main scan direction, and the read results are temporarily stored in the offset RAM 122. The system controller 111 compares the data written in the offset RAM 122 with white color target density data, and a difference therebetween is written in the offset RAM 122 as shading data. By using this shading data, image data obtained during film scanning is corrected.

Figure 9A:
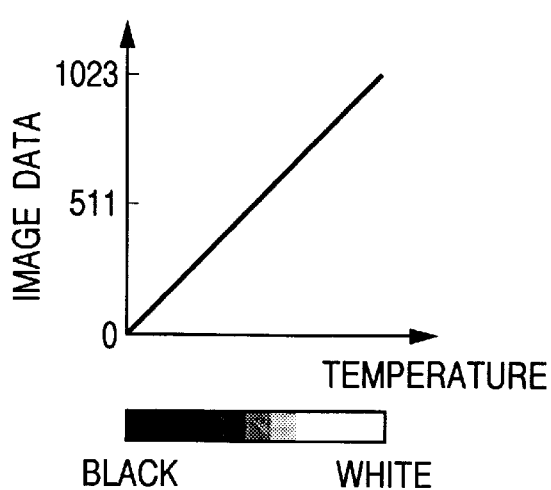
FIGS. 9A and 9B are diagrams illustrating gamma correction.
Figure 9B:
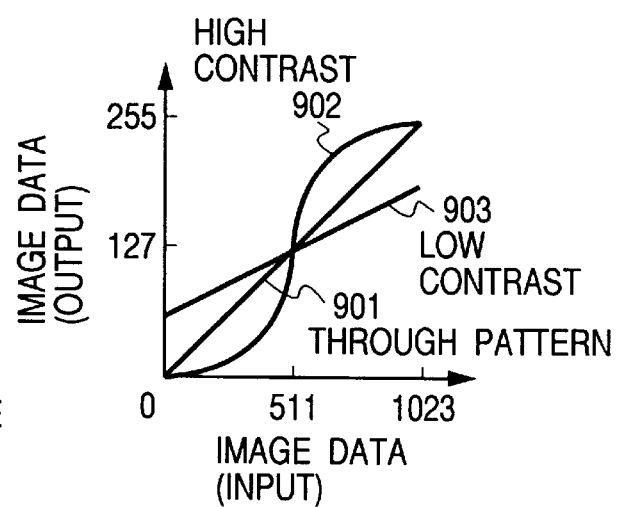
Figure 10A:
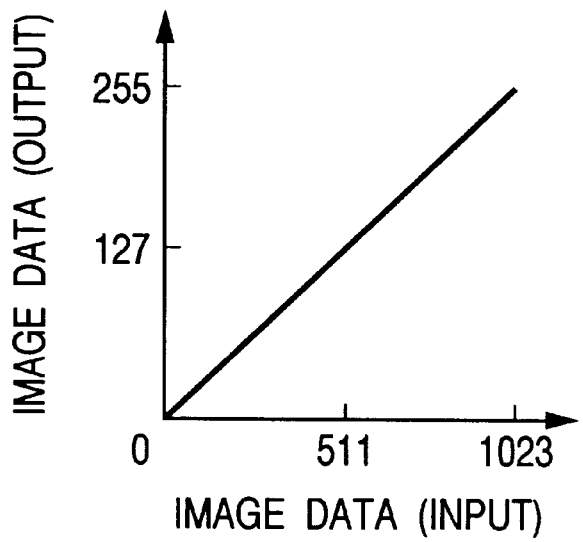
FIGS. 10A and 10B are diagrams illustrating gamma correction.
Figure 10B:
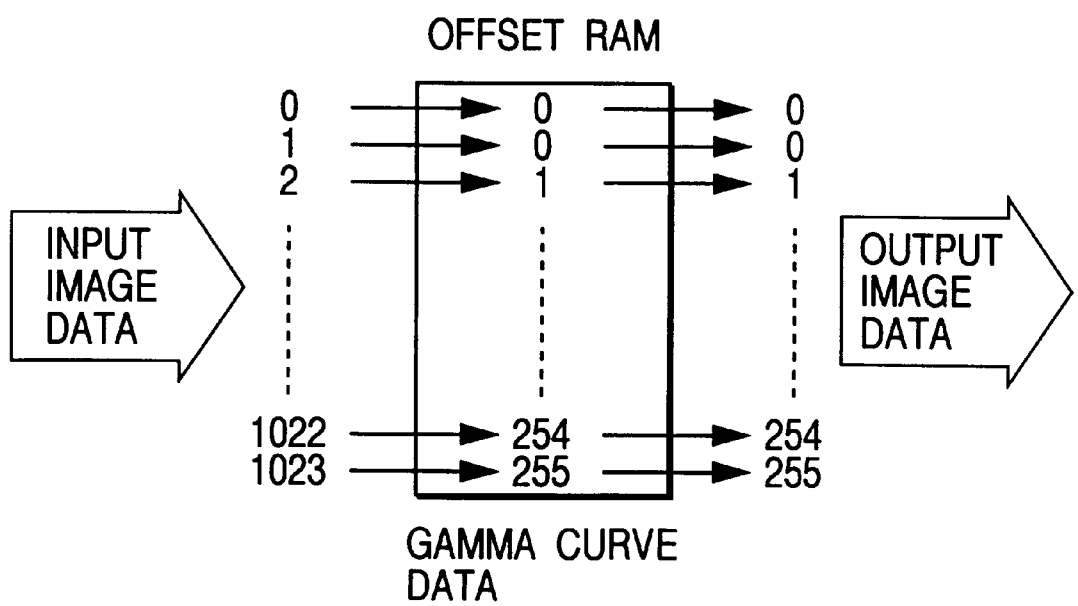

Reference numeral 203 represents a gamma correction circuit which performs image contrast adjustment and conversion of 10-bit image data into 8-bit image data. FIG. 9B shows examples of gamma correction curves in which the abscissa represents input image data value (0 to 1023) and the ordinate represents output data value (0 to 255). FIG. 9A shows a relationship between density and image data. Reference numeral 901 represents a gamma curve called a through pattern by which input 10-bit data is linearly converted into output 8-bit data. Reference numeral 902 represents a gamma conversion curve by which the image density is emphasized based on a high contrast pattern. Reference numeral 903 represents a gamma conversion curve by which the image density is suppressed based on a low contrast pattern. Such conversions are set by directly designating gamma conversion patterns displayed through software in a gamma conversion selection window of the external equipment 114. The set gamma conversion curve data is transmitted to the system controller 111 and stored in the offset RAM 122. The gamma conversion curve data suitable for input image data is read from the offset RAM and the input image is processed accordingly (refer to FIGS. 10A and 10B).

Figure 11:
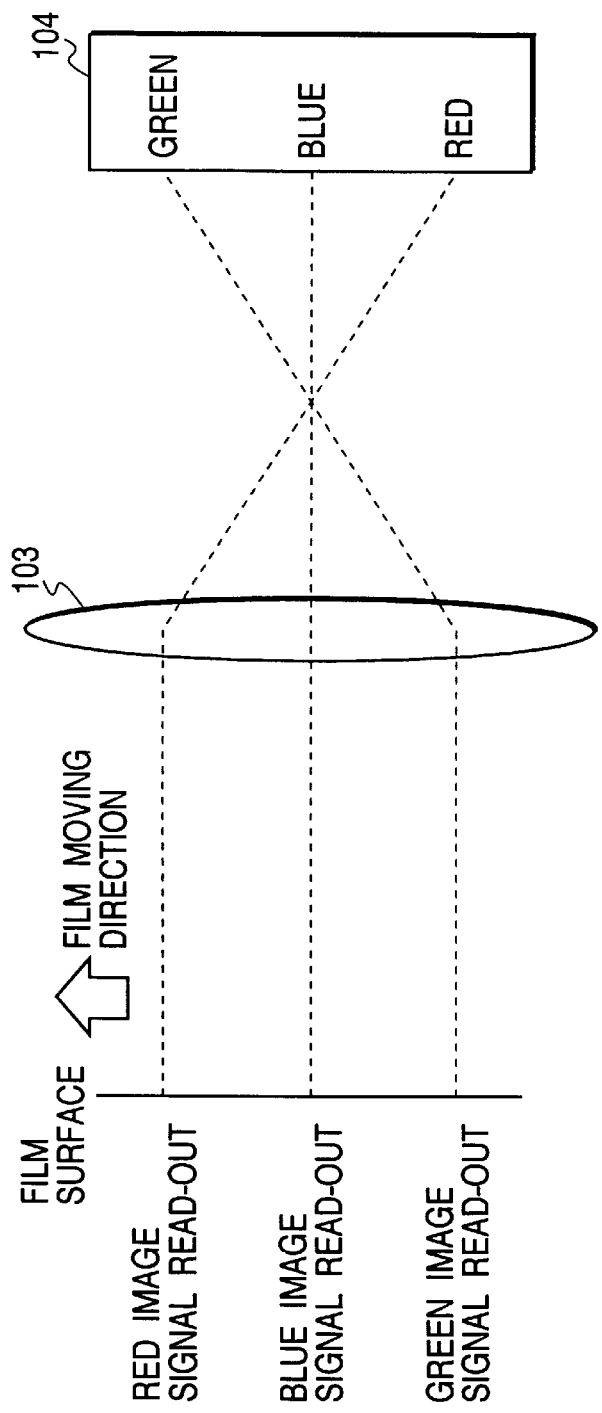
FIG. 11 is a diagram illustrating color data reading.
Figure 12:
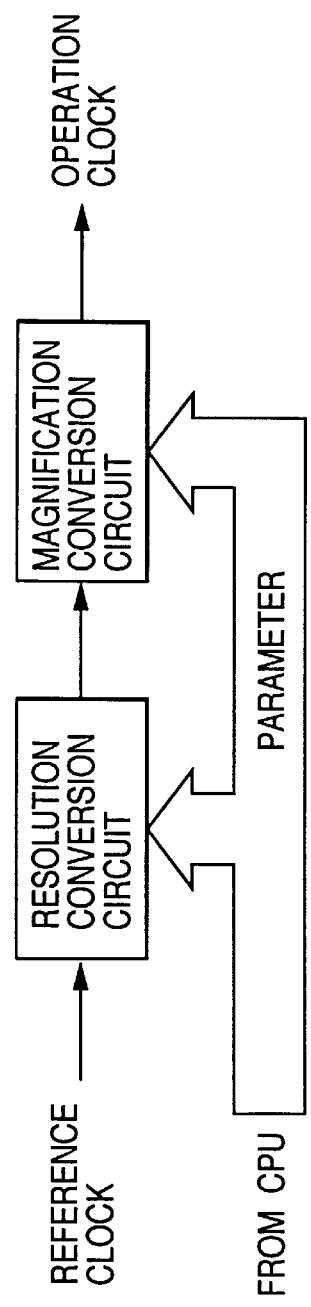
FIG. 12 is a diagram illustrating inputs to a resolution conversion circuit and a magnification conversion circuit.

Reference numeral 204 represents a color data synthesization circuit for correcting a line shift of the 3-line linear image sensor 104. As shown in FIG. 11, in the linear image sensor 104, lines along which red, green and blue colors are read are disposed in parallel relative to the film motion direction (sub scan direction). Therefore, red, green and blue image data are not read at the same time, but the data are read at positions shifted by some lines. From this reason, after all image data of the same line are stored in the offset RAM 122, one-line color data is output therefrom.

Figure 13:
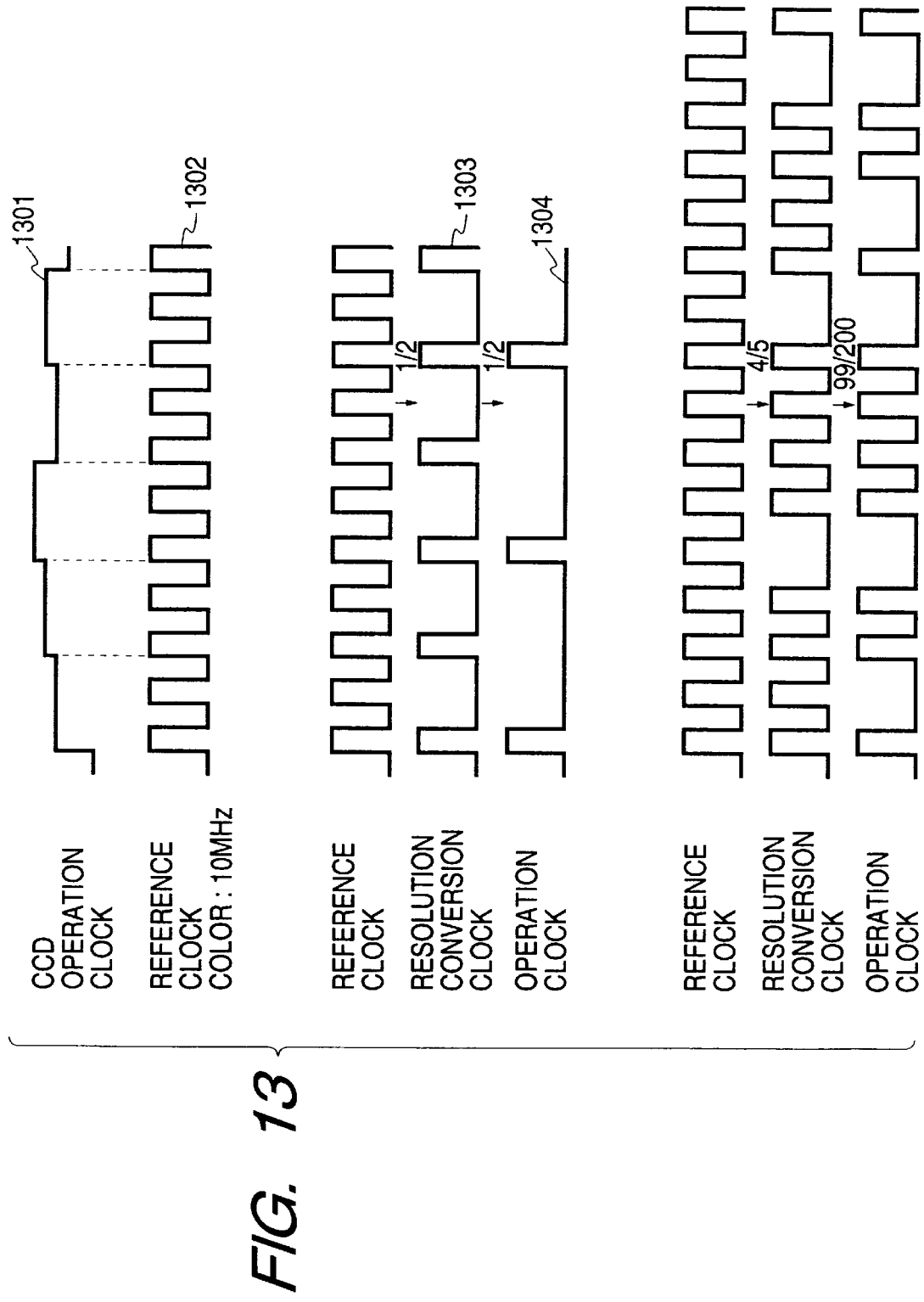
FIG. 13 is a diagram illustrating resolution conversion and magnification conversion in a main scan direction.
Figure 14A:
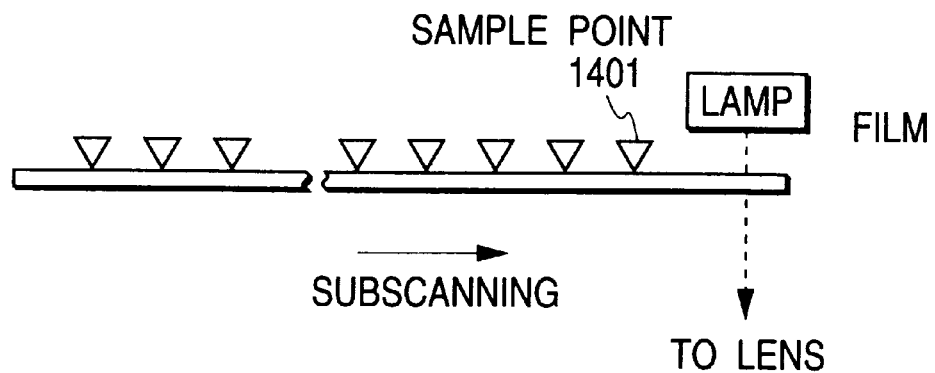
FIGS. 14A, 14B and 14C are diagrams illustrating resolution conversion and magnification conversion in a sub scan direction.
Figure 14B:
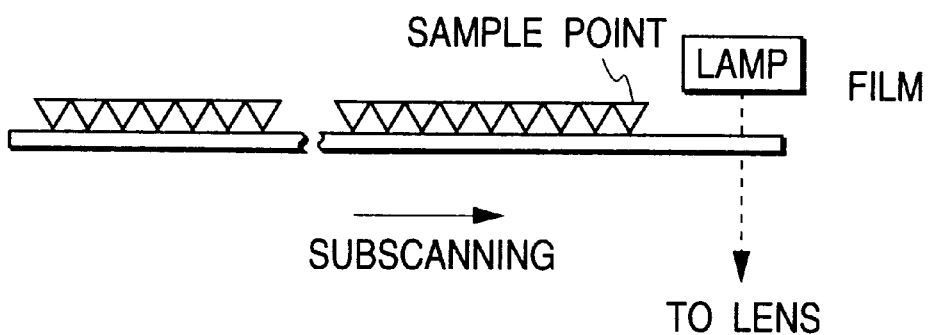
Figure 14C:
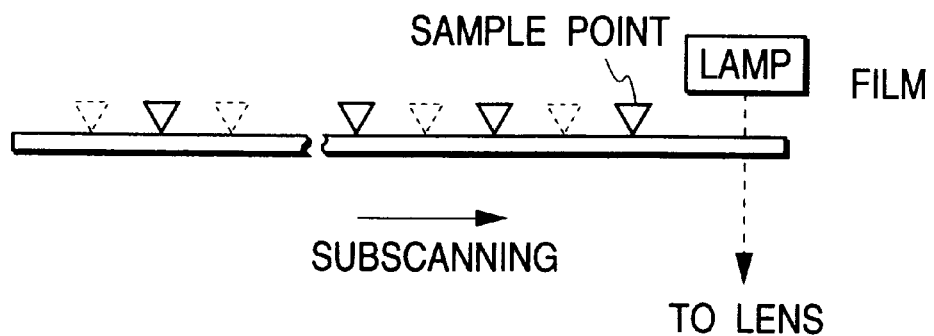

Reference numeral 205 represents a resolution conversion/magnification conversion circuit which is set with conversion parameters as shown in FIG. 11 by the system controller 111. The operations of resolution conversion and magnification conversion in the main scan direction are illustrated in FIG. 13. Reference numeral 1301 represents a CCD clock which is one of the drive pulses 120 for CCD 104. Reference numeral 1302 is a reference clock which has a frequency twice as high as the CCD operation clock. If image processing is performed using this reference clock, an output of each pixel is processed as two image data so that an output image has a magnification factor 200% of an image picked up at the optical resolution (namely, this output image is formed in accordance with an instruction of a unity of the optical resolution and a magnification factor of 200%). If the external equipment 114 issues an instruction of a half of the optical resolution and a magnification factor of 100%, the resolution conversion circuit thins one-pixel read clocks by a half, and then the magnification conversion circuit further thins the clocks by a half to generate the CCD operation clock. The operations of resolution conversion and magnification conversion in the sub scan direction are illustrated in FIGS. 14A to 14C. Reference numeral 1401 represents a sampling point in the sub scan direction. If the resolution or imagnification factor is to be increased, as shown in FIG. 14B the film is moved at low speed to use sample points more than an ordinary read shown in FIG. 14A. Conversely, if the resolution or magnification factor is to be reduced, part of the read line read is not written in RAM although the film is moved at the ordinary speed.

Reference numeral 206 represents a filtering circuit for preventing the image quality from being lowered by the resolution conversion/magnification conversion circuit 205. The contents of the filtering process are summarized in Table 1.

TABLE 1

| | Filtering Process | | | | |
|---|---|---|---|---|---|
| | | | Tone | | |
| Resolution (dpi) | Main scan interpolation | Sub scan interpolation | Averaging | Smoothing | Edge Process |
| 24 bits | | | | | |
| 170–340 | x | ○ | ○ | x | x |
| 341–680 | x | ○ | ○ | x | x |
| 681–1360 | x | ○ | ○ | x | x |

TABLE 1-continued

Filtering Process

| Resolution (dpi) | Tone | | | | |
|---|---|---|---|---|---|
| | Main scan interpolation | Sub scan interpolation | Averaging | Smoothing | Edge Process |
| 1361–2719 | ○ | ○ | × | ○ | ○ |
| 2720 | × | × | × | × | × |
| 2720–5440 | ○ | × | × | ○ | ○ |
| 8 bits | | | | | |
| 170–340 | × | ○ | ○ | × | × |
| 341–680 | × | ○ | ○ | × | × |
| 681–1360 | × | ○ | ○ | × | × |
| 1361–2719 | ○ | ○ | × | ○ | ○ |
| 2720 | × | × | × | × | × |
| 2720–5440 | ○ | × | × | ○ | ○ |
| binary | | | | | |
| 170–340 | × | ○ | ○ | × | ○ |
| 341–680 | × | ○ | ○ | × | ○ |
| 681–1360 | × | ○ | ○ | × | ○ |
| 1361–2719 | ○ | ○ | × | ○ | ○ |
| 2720 | × | × | × | × | × |
| 2720–5440 | ○ | × | × | ○ | ○ |

In this example, selectively performed in accordance with the tone (gradation) and resolution are main scan interpolation, sub scan interpolation, averaging, smoothing, and edge processing. That is, in the Table 1, "o" denotes that a corresponding processing is performed, and "x" denotes that the corresponding processing is not performed. The contents of these filtering processes are already known so that the description thereof is omitted.

Figure 15:
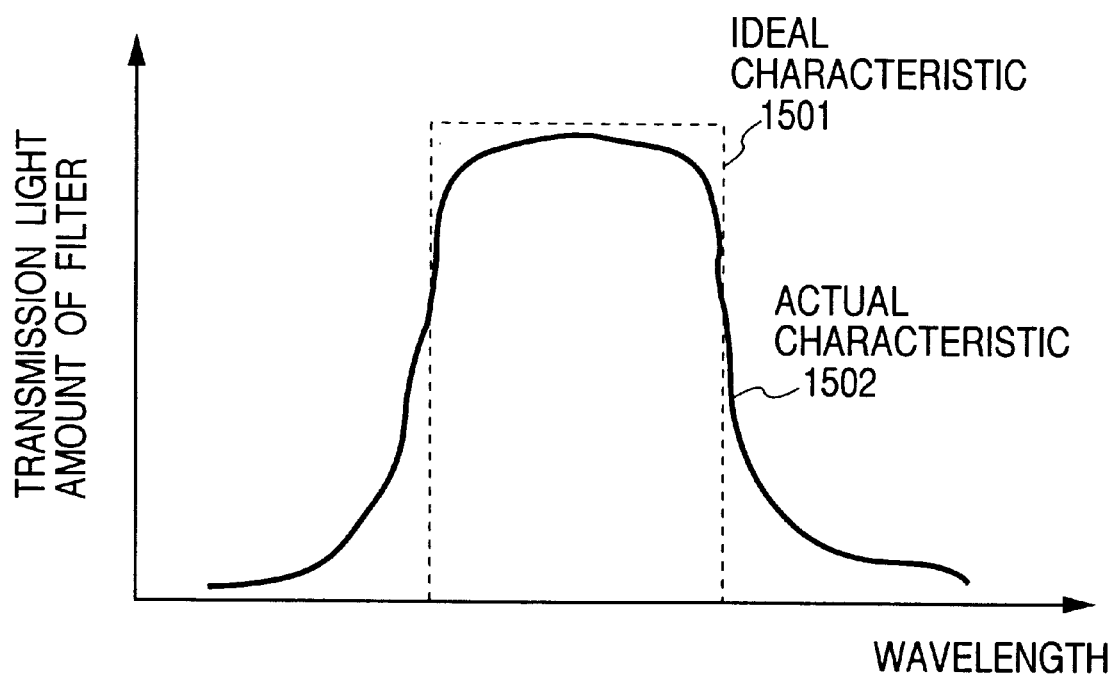
FIG. 15 is a diagram illustrating masking correction.

Reference numeral 207 represents a masking processing circuit for correcting the transmission characteristics of RGB filters of CCD 104. As indicated at 1501 in FIG. 15, a color filter ideally transmits light having only a specific wavelength range and intercepts light having other wavelength ranges. However, in practice, as indicated at 1502, light having an unnecessary light wavelength range is also transmitted. In view of this, the following masking correction is executed to correct the actual transmission characteristics and make them nearly ideal.

$$\begin{pmatrix} Rout \\ Gout \\ Bout \end{pmatrix} = \begin{pmatrix} Rr & Gr & Br \\ Rg & Gg & Bg \\ Rb & Gb & Bb \end{pmatrix} \begin{pmatrix} Rin \\ Gin \\ Bin \end{pmatrix}$$

where Rin, Gin and Bin: input signals to the masking processing circuit,

Rout, Gout and Bout: output signals from the masking processing circuit,

Rr, Gr and Br: correction coefficients of a filter,

Rg, Gg and Bg: correction coefficients of a filter, and

Rb, Gb and Bb: correction coefficients of a filter.

Figure 16A:
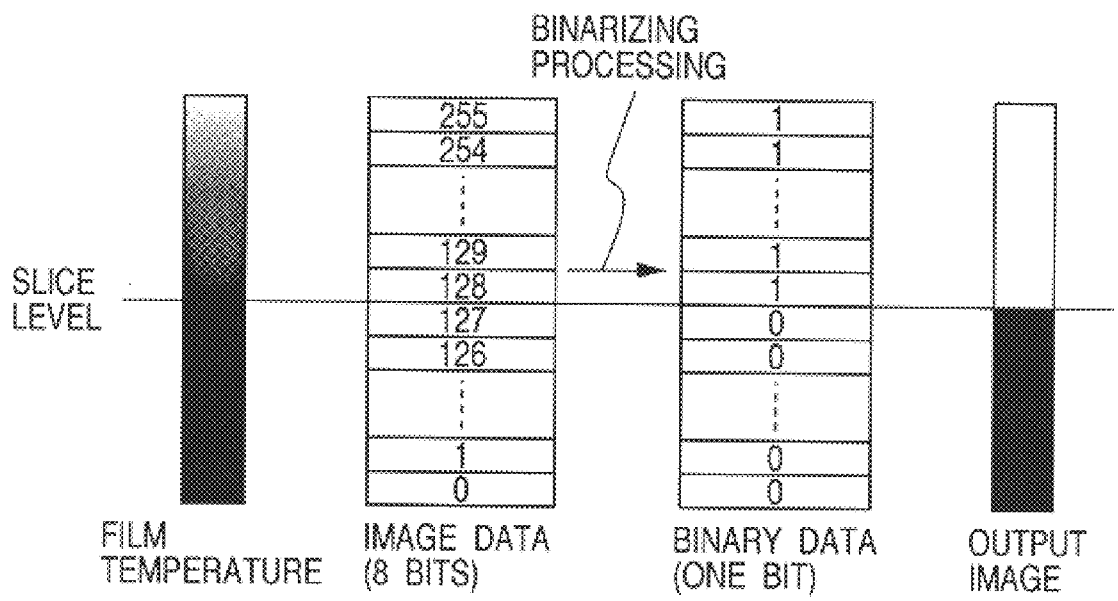
FIGS. 16A and 16B are diagrams illustrating a binarization process and an AE function.
Figure 16B:
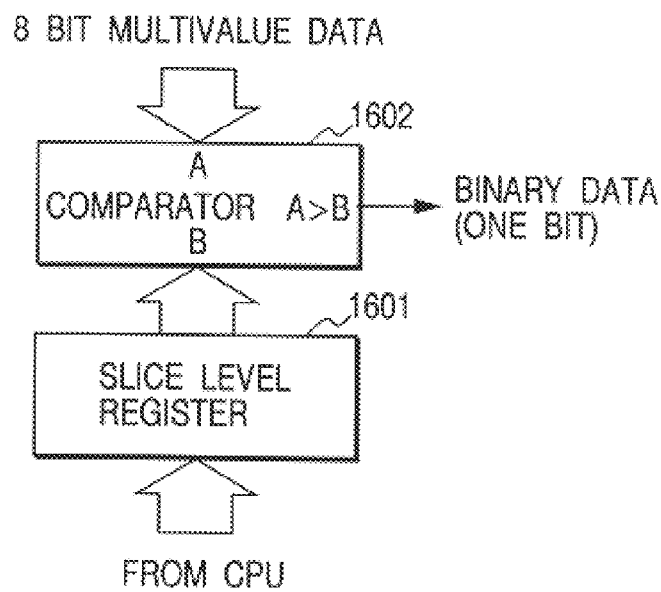

Reference numeral 208 represents a binarizing processing/AE processing circuit. In this example, 8-bit multi-valued data is converted into binary image data which represents one bit by black and white. Upon instruction of a binarizing process from the external equipment 114, the system controller 111 sets parameters to a slice level register 1601 shown in FIG. 16B. Representing this parameter data by B and the 8-bit multi-valued data by A, a comparator 1602 compares A with B. If A>B, the comparator outputs "1" whereas if not it outputs "0" to thus generate binary data (refer to FIG. 16A). In this case, an AE function is also effected in order to output binary data with good reproductivity, by automatically changing a slice level if the density of an original changes during the film scanning. Specifically, during the film scanning, white and black peak values for each line are picked up to determine an optimum slice level for each line and rewrite the contents of the slice level register 1601.

Figure 17A:
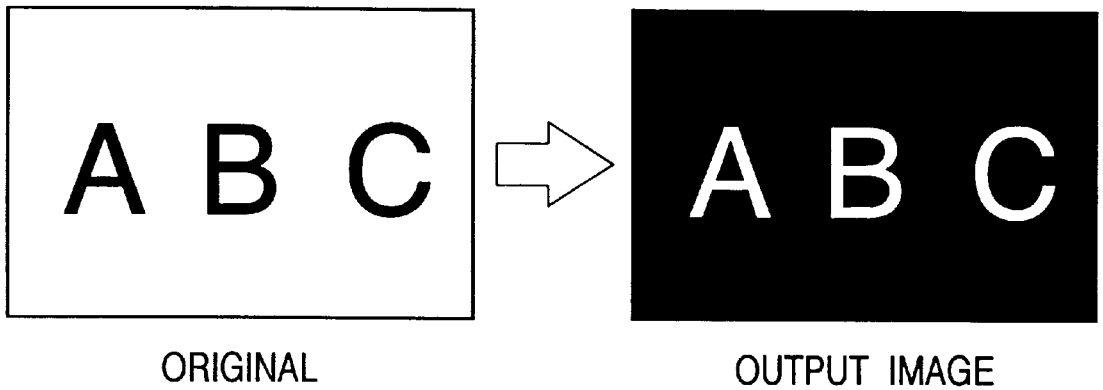
FIGS. 17A and 17B are diagrams illustrating negative/positive inversion.
Figure 17B:
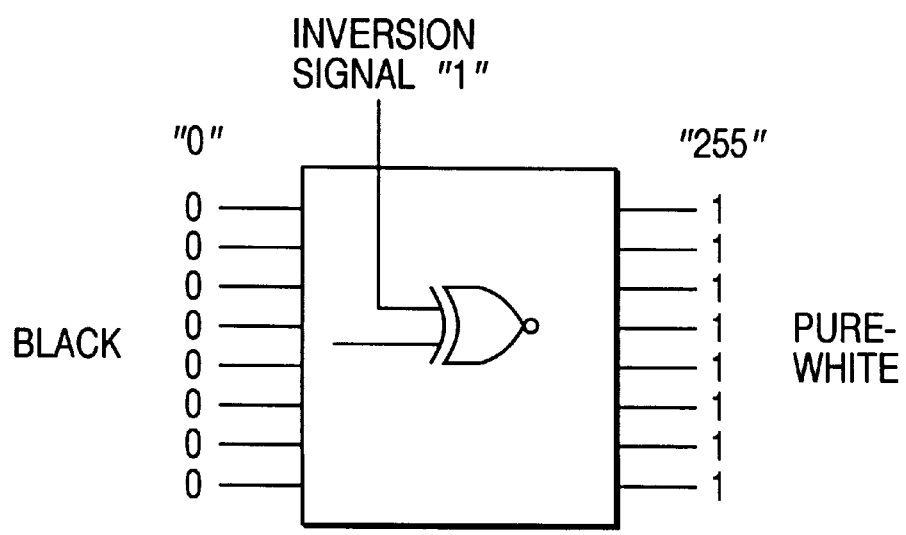

Reference numeral 209 represents a negative/positive inversion circuit which, as shown in FIG. 17A, inverts the density level of image data of an input original. This negative/positive inversion circuit 209 is constituted of an exclusive logical sum gate such as shown in FIG. 17B. As the system controller 111 sets an inversion signal "1", data of each pixel is inverted.

Figure 18:
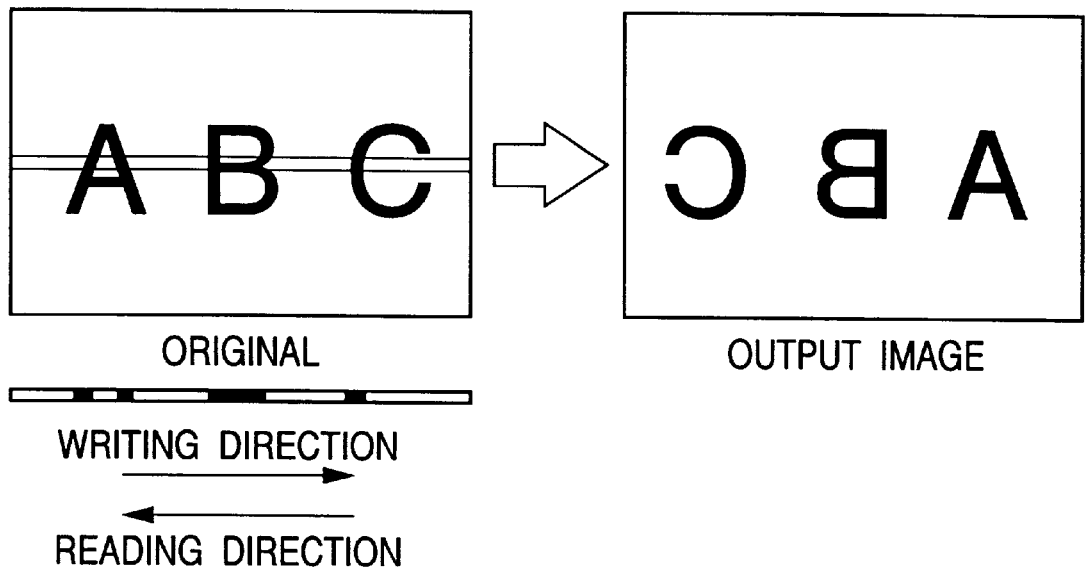
FIG. 18 is a diagram illustrating a mirror image process.

Reference numeral 210 represents a mirror image processing circuit which, as shown in FIG. 18, rotates image data by 180 degrees in the main scan direction (to obtain an image reflected by a mirror). This processing is effected by reading image data written in the line buffer 109 in the reverse order.

Figure 19:
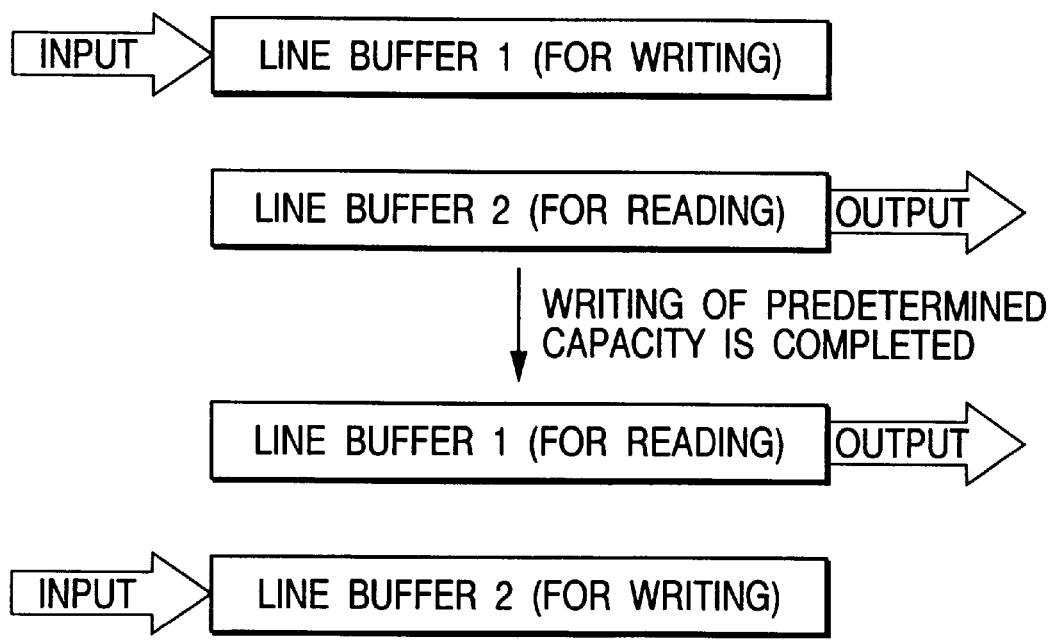
FIG. 19 is a diagram illustrating the operation of a line buffer.

Reference numeral 109 represents the line buffer for temporarily storing image data after the image processing. As shown in FIG. 19, the structure of this line buffer 109 has two blocks for reading and writing. While image data is written in one block, image data in the other block is read. After image data is written by a predetermined amount, the write operation is switched to the read operation.

Reference numeral 110 represents the interface circuit which is in this example a SCSI controller.

Next, the operation of the film scanner of this embodiment will be described with reference to the flow charts shown in FIGS. 20A and 20B to 27.

Figure 20B:
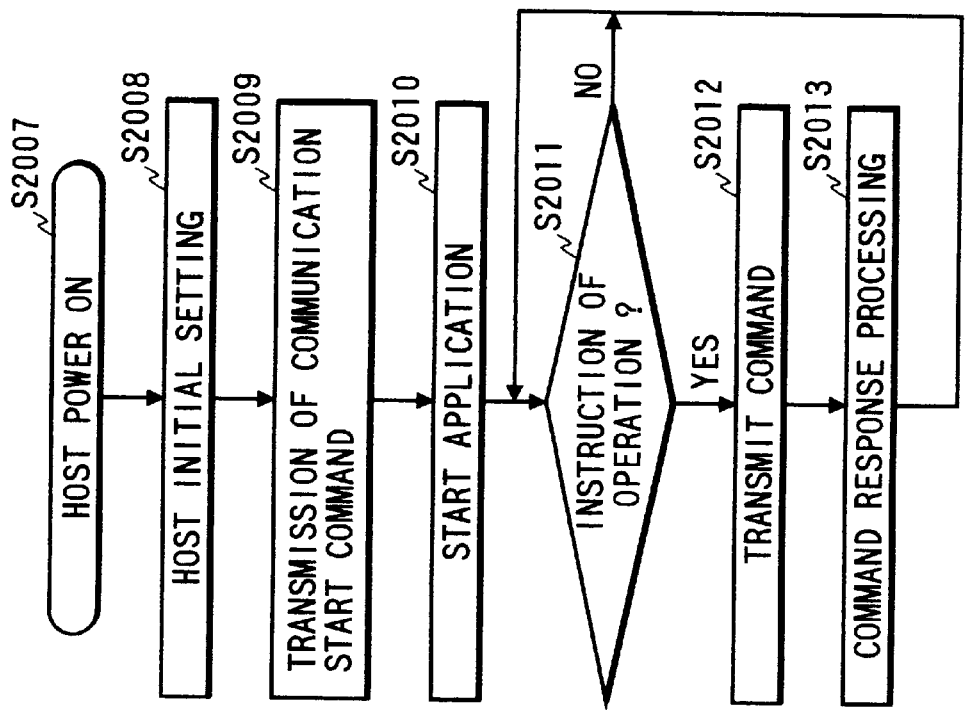
FIGS. 20A and 20B are flow charts illustrating a communication pattern used by the film scanner and an external equipment.
Figure 20A:
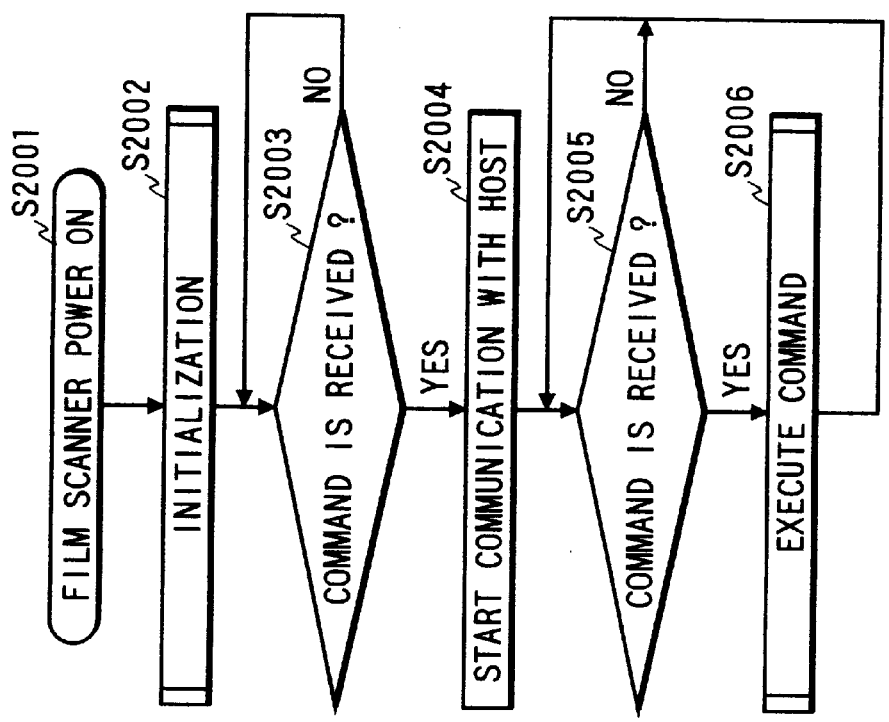

FIGS. 20A and 20B illustrate a basic communications pattern used by the film scanner and the external equipment 114.

At Step S2001 the film scanner is powered.

At Step S2002 initialization (such as firmware initialization) is performed.

At Step S2007 the external equipment 114 is powered.

At Step S2008 the external equipment 114 is initialized. Memories and SCSI controller are checked.

Step S2003 is a command wait routine for waiting any command from the external equipment 114. If there is no command, the flow stands by at this Step S2003, whereas if there is a command, the flow advances to Step S2004.

At Step S2009 a communication start command is transmitted to enable communications with the film scanner.

At Step S2004 communications with the external equipment 114 start.

At Step S2010 application software including the driver software is activated.

At Step S2011 a user enters an operation command requesting the film scanner to execute some task running on the application software. A stop command for the application software is also used at this Step S2011. If this command is entered, the communications are intercepted to terminate the application software.

At Step S2012 the driver software generates the operation command and transmits it to the film scanner.

At Step S2005 it is checked whether there is a command. If not, the flow stands by at this Step S2005, whereas if there is a command the flow advances to Step S2006.

At Step S2006 upon reception of the command, the firmware issues an operation sequence to execute it. Information of this execution is sent back to the external equipment 114.

At Step S2013 upon reception of the operation execution information from the film scanner, information to this effect is informed to the user via the application software. After this process, the flow returns to Step S2011.

Figure 21:
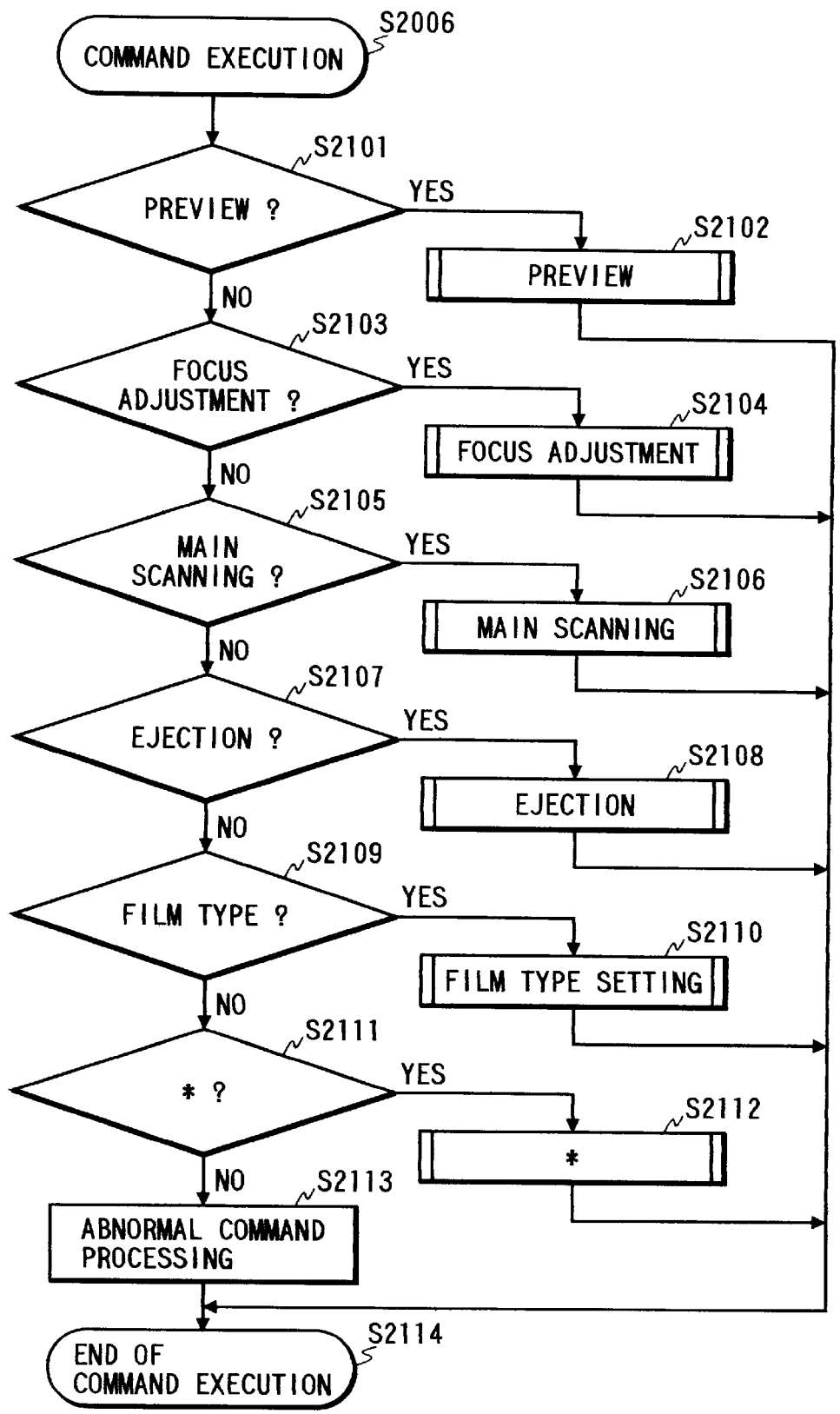
FIG. 21 is a flow chart illustrating a command execution operation.
Figure 22:
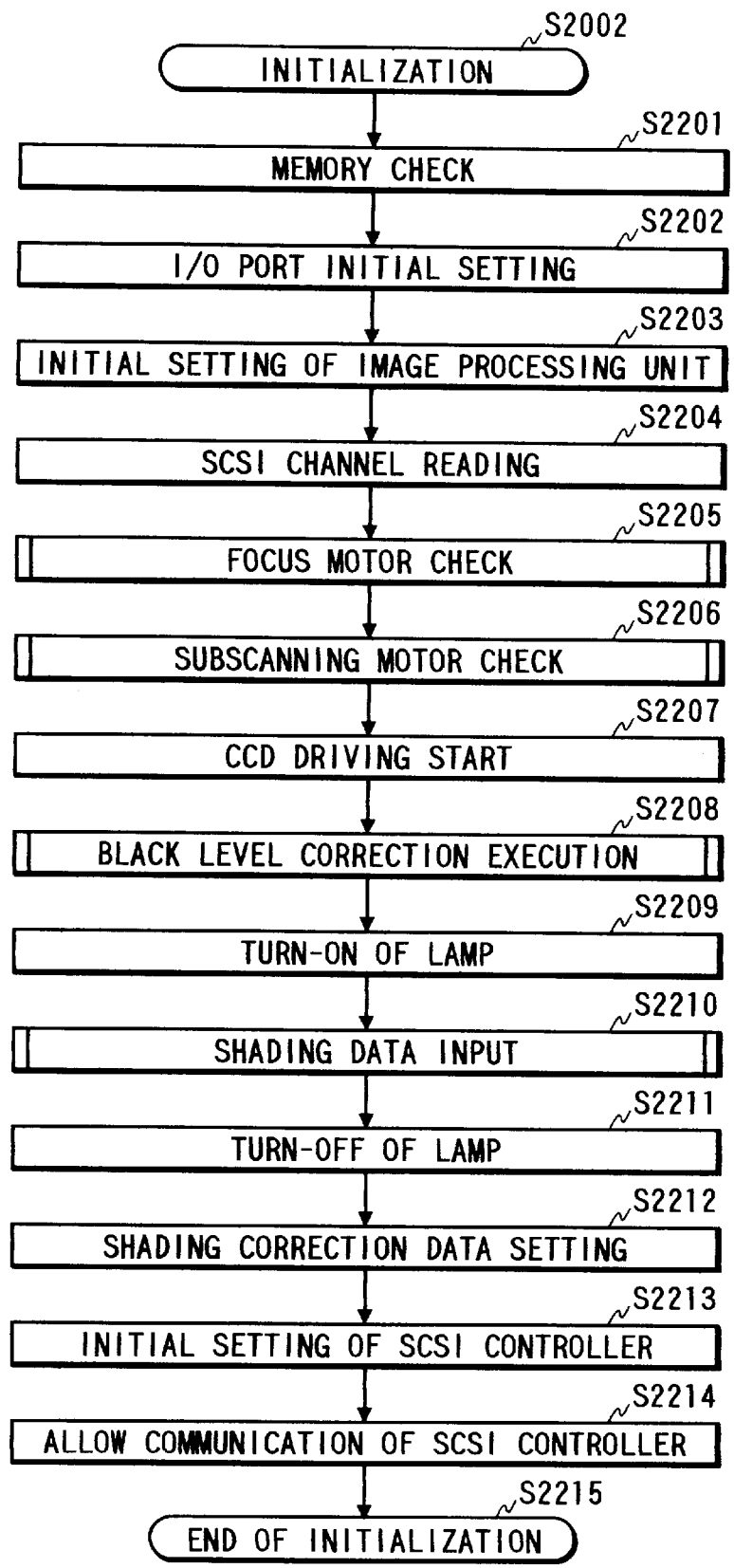
FIG. 22 is a flow chart illustrating an initializing operation.

The command execution routine by the firmware at Step S2006 is illustrated in FIG. 21.

At Step S2101 it is checked whether the command is a preview command. If it is the preview command, the flow advances to Step S2102, whereas if not, the flow advances to Step S2103.

At Step S2102 a sequence for executing the preview command is executed.

At Step S2103 it is checked whether the command is a focus adjustment command. If it is the focus adjustment command, the flow advances to Step S2104, whereas if not, the flow advances to Step S2105.

At Step S2104 a sequence for executing the focus adjustment command is executed.

At Step S2105 it is checked whether the command is a main scan command. If it is the main scan adjustment command, the flow advances to Step S2106, whereas if not, the flow advances to Step S2107.

At Step S2106 a sequence for executing the focus main or substantial scan command is executed.

At Step S2107 it is checked whether the command is an ejection command. If it is the ejection command, the flow advances to Step S2108, whereas if not, the flow advances to Step S2109.

At Step S2108 a sequence for executing the ejection command is executed.

At Step S2109 it is checked whether the command is a film type command. If it is the film type command, the flow advances to Step S2110, whereas if not, the flow advances to Step S2111.

At Step S2110 a sequence for executing the film type command is executed.

At Step S2111 it is checked whether the command is another command. If it is the other command, the flow advances to Step S2112, whereas if not, the flow advances to Step S2113.

At Step S2112 a sequence for executing the other command is executed.

At Step S2113 a process for an abnormal command is executed.

At Step S2114, a command execution end is notified to the external equipment 114 to terminate the command execution routine.

Next, the above processes will be sequentially described more in detail. The initialization process at Step S2002 shown in FIG. 20A is executed in the manner illustrated in FIG. 22.

At Step S2201 the line buffer 109 and offset RAM 122 are checked.

At Step S2202 input/output ports of the system controller 111 are initialized.

At Step S2203 the image processing unit 108 is initialized to make it enabled.

At Step S2204 the system controller 111 reads an ID number of the SCSI controller.

At Step S2205 the system controller 111 drives the focus motor 123 to move the focus fixing member to the focus initial position, and at the same time checks the focus position detection unit 125.

At Step S2206 the system controller 111 drives the subscanning motor 115 to move the film to the sub scan initial position, and at the same time checks the sub scan position detection unit 117.

At Step S2207, the system controller 111 allows the image processing unit 108 to output the drive signal 120. At Step S2208, black level correction is executed.

At Step S2209 the system controller 111 issues a light turn-on command to the light turn-on circuit 118.

At Step S2210 shading data is input.

At Step S2211 the system controller 111 issues a light turn-off command to the light turn-on circuit 118.

At Step S2212 shading correction data is set to the offset RAM 122.

At Step S2213 the system controller 111 initializes the interface unit 110 (SCSI controller).

At Step S2214 the system controller 111 permits the interface unit 110 to communicate with the external equipment.

At Step S2215 the initializing process is terminated.

Figure 23:
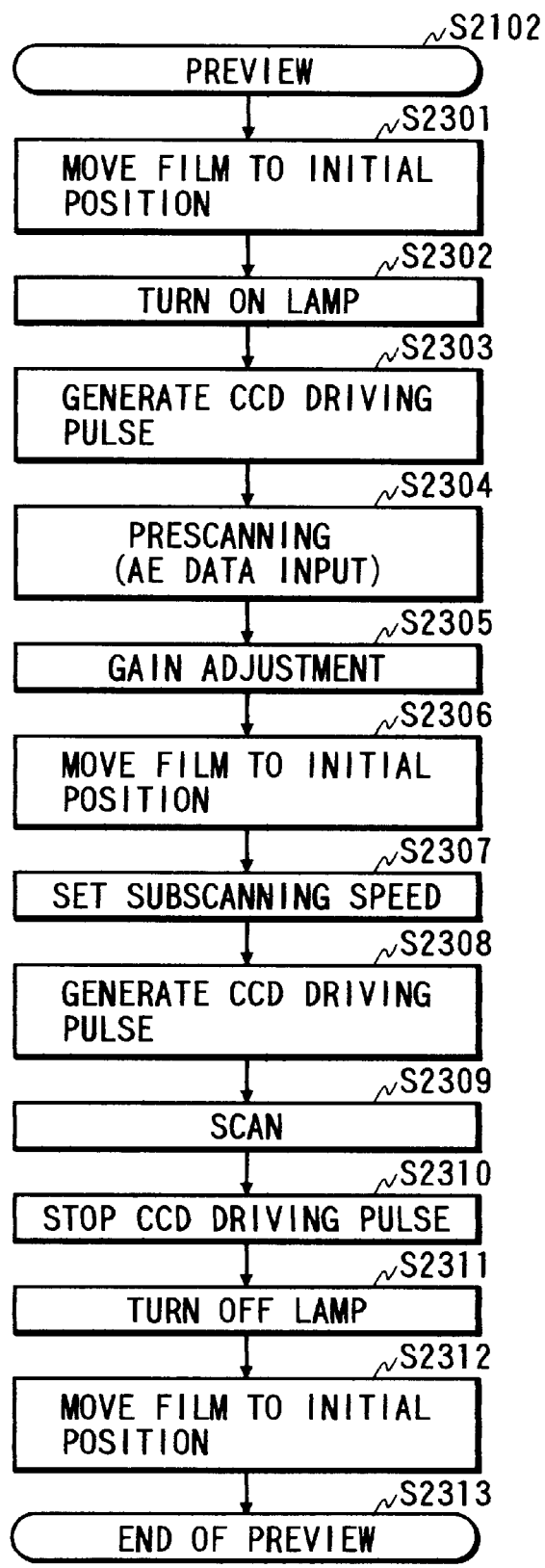
FIG. 23 is a flow chart illustrating a preview operation.

Next, the contents of each command will be described. The operation contents of the preview at Step S2102 are illustrated in FIG. 23.

At Step S2301 the system controller 111 monitors the state of the sub scan position detection unit 117 and controls the subscanning motor 115 to move the film to the initial position.

At Step S2302 the system controller 111 issues the light turn-on command to the light turn-on circuit 118.

At Step S2303 the system controller 111 allows the image processing unit 108 to generate drive pulses 120.

At Step S2304 the subscanning motor 115 is controlled to position align the central area of the film to acquire light amount data. Although the linear image sensor 104 is used as the light amount sensor, another sensor may be used for the measurement of the light amount data.

At Step S2305, the gain is adjusted in accordance with the light amount data in Step S2304 in the analog image processing circuit 126. If the light amount is small, the gain is increased, whereas if it is large, the gain is lowered.

At Step S2306 the subscanning motor 115 is driven to move the film to the film initial position.

At Step S2307 a sub scan speed is set for the preview operation.

At Step S2308 a resolution is set for the preview operation, and drive pulses 120 are output in accordance with an output from the resolution conversion/magnification conversion circuit 205.

At Step S2309 a signal processing area for the preview operation is set to the image processing unit 108 to start a scanning operation.

At Step S2310 the drive pulses 120 output at Step S2308 are stopped.

At Step S2311 the system controller 111 issues the light turn-off command to the light turn-on circuit 118.

At Step S2312 the film position changed during the scanning operation at Step S2309 is moved back to the initial position.

At Step S2313 the preview operation is terminated.

Figure 24:
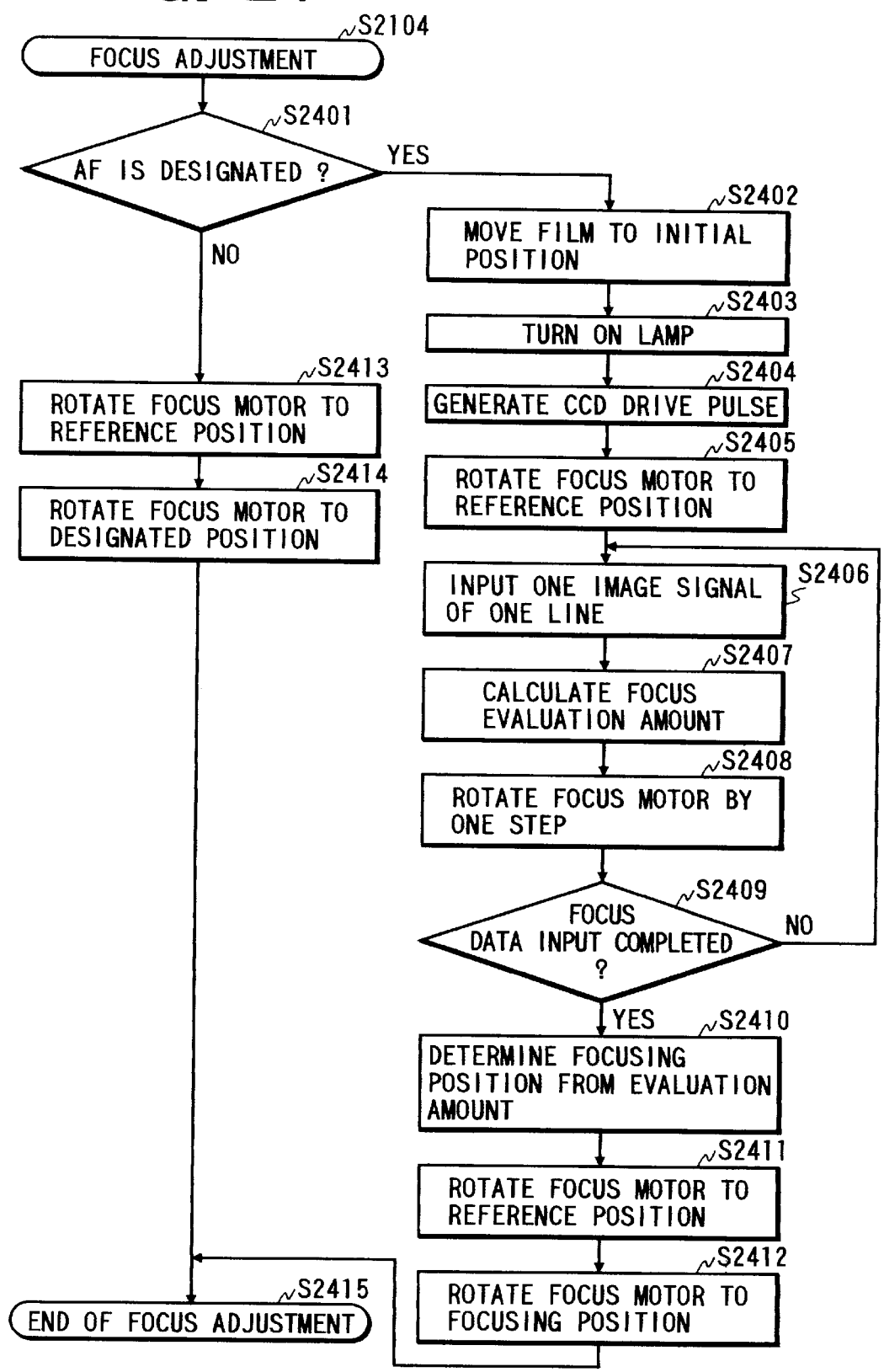
FIG. 24 is a flow chart illustrating a focussing operation.

The operation contents of the focus adjustment at Step S2104 are illustrated in FIG. 24.

At Step S2401 it is checked whether the command contains a designation of an auto focus (AF). If there is an auto focus designation, the flow advances to Step S2402, whereas if not, the flow advances to Step S2413.

At Step S2402 the subscanning motor 115 is driven until the film moves to the focus operation position.

At Step S2403 the system controller 111 issues the light source turn-on command to the light source turn-on circuit 118.

At Step S2404 in order to read the film at the optical resolution, the system controller 111 issues a command to the resolution conversion/magnification conversion circuit 205 and generates the drive signals 120.

At Step S2405 the focus motor 123 is driven to move the focus fixing member 105 to the initial position.

At Step S2406 one-line image signal is received and temporarily stored in the offset RAM 122.

At Step S2407 a sharpness degree is calculated to be used as a focus evaluation amount. This sharpness degree together with the focus position are stored. The sharpness degree is calculated as a sum of squares of output differences between adjacent pixels, which is well known in the art.

At Step S2408 the focus position is moved by one step.

At Step S2409 if all data in the focus area is received, the flow advances to Step S2410, whereas if not, the flow returns to Step S2406.

At Step S2410 it is decided that the focus position indicating the highest sharpness degree among the focus evaluation amounts is an in-focus position.

At Step S2411 the focus motor 123 is controlled to move the focus fixing member 105 to the reference position.

At Step S2412 the focus motor 123 is controlled to move the focus fixing member 105 to the in-focus position.

At Step S2413 the focus motor 123 is controlled to move the focus fixing member 105 to the reference position.

At Step S2414 the focus motor 123 is controlled to move the focus fixing member 105 to the initial setting position.

At Step S2415 the subscanning motor 115 is driven to move the film to the sub scan initial position. Thereafter, the focus adjustment process is terminated.

Figure 25:
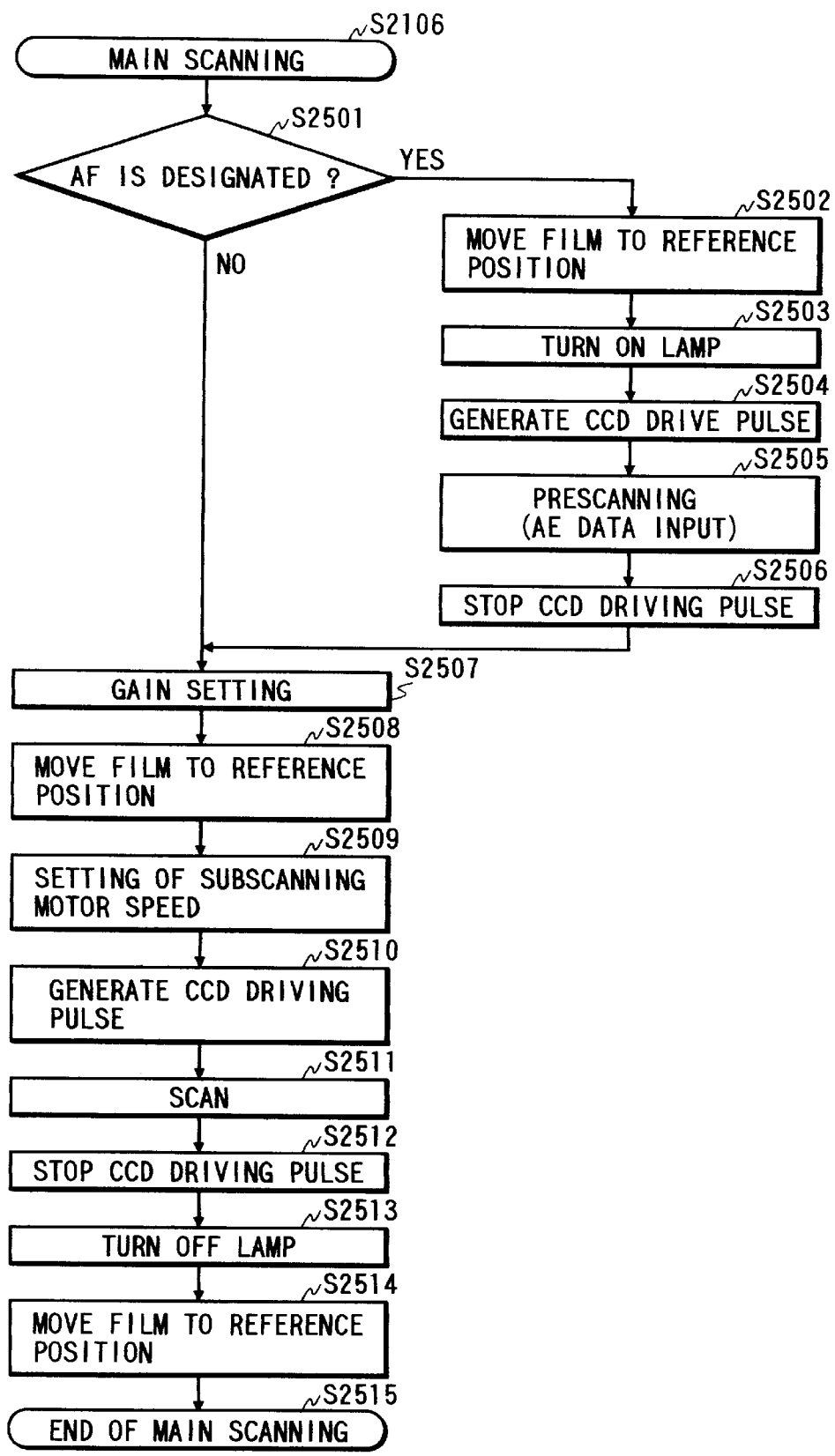
FIG. 25 is a flow chart illustrating a substantial or main scan operation.

The operation contents by the main or substantial scan at Step S2106 are illustrated in FIG. 25.

At Step S2501 it is checked whether the received main scan contains an AE designation command. If contained, the flow advances to Step S2502, whereas if not, the flow advances to Step S2507.

At Step S2502 the system controller 111 controls the subscanning motor 115 to move the film to the sub scan initial position.

At Step S2503 the system controller 111 issues the light source turn-on command to the light source turn-on circuit 118.

At Step S2504 the system controller 111 supplies setting for a drive pulse for light amount measurement to the resolution conversion/magnification conversion circuit 205 to allow the generation of the drive signal 120.

At Step S2505 a pre-scan is executed and a film density value is estimated from the measured light amount to calculate the gain value.

At Step S2506 the drive signal 120 is stopped.

At Step S2507 the gain value is set.

At Step S2508 the system controller 111 controls the subscanning motor 115 to move the film to the sub scan initial position.

At Step S2509 a speed of the subscanning motor 115 is set in accordance with a resolution set in the main or subsidiary scan command.

At Step S2510 setting for an operation pulse for main scan direction is supplied to the resolution conversion/ magnification conversion circuit 205 in accordance with the resolution set in the main or substantial scan command, to thereby allow the generation of the drive signal 120.

At Step S2511 a scan amount in the sub scan direction and an image processing area in the main scan direction are determined in accordance with the scan area set in the main or substantial scan command, to thereafter execute the main or substantial scan. Since the initial position setting is changed, a user becomes free of cumbersome trimming works. At the same time, since the signal processing area is changed, it becomes possible to shorten the signal processing time.

At Step S2512 the drive signal 120 generated at Step S2510 is stopped.

At Step S2513 the system controller 111 issues the light source turn-off command to the light source turn-on circuit 118.

At Step S2514 the sub scan position detection unit 117 is monitored to drive the subscanning motor 115 and move the film to the film initial position.

At Step S2515 this main or substantial scan is terminated.

Figure 26:
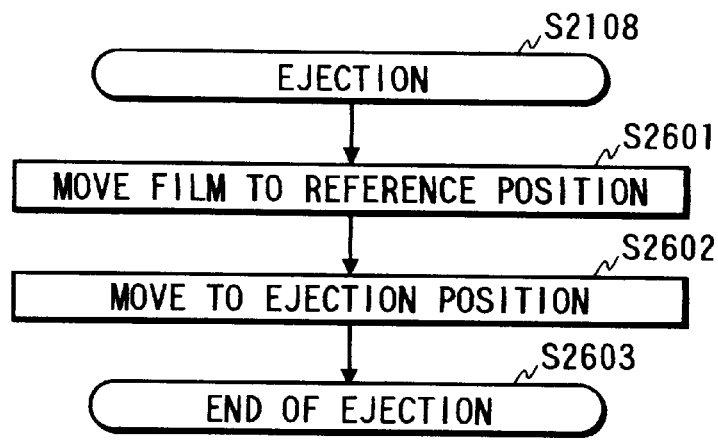
FIG. 26 is a flow chart illustrating an ejecting operation.

The operation contents of the ejection at Step S2108 are illustrated in FIG. 26.

At Step S2601 the system controller 111 monitors the sub scan position detection unit 117 to drive the subscanning motor 115 and move the film to the sub scan initial position.

At Step S2602 the film is moved outward from the reference position by several pulses to place it at an ejection position.

At Step S2603 the subscanning motor 115 is stopped when the ejection position is obtained, and the ejection is terminated.

Figure 27:
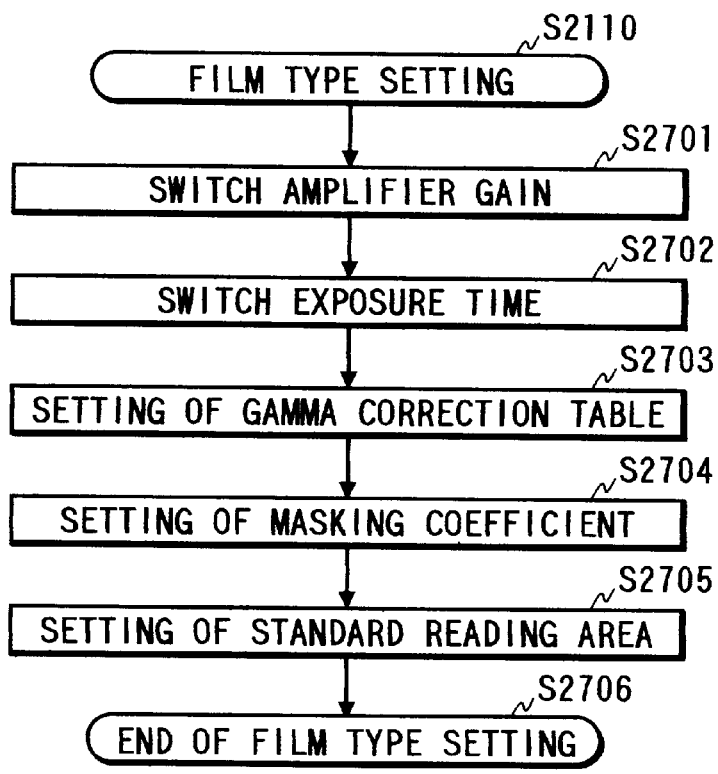
FIG. 27 is a flow chart illustrating a film type setting operation.
Figure 28:
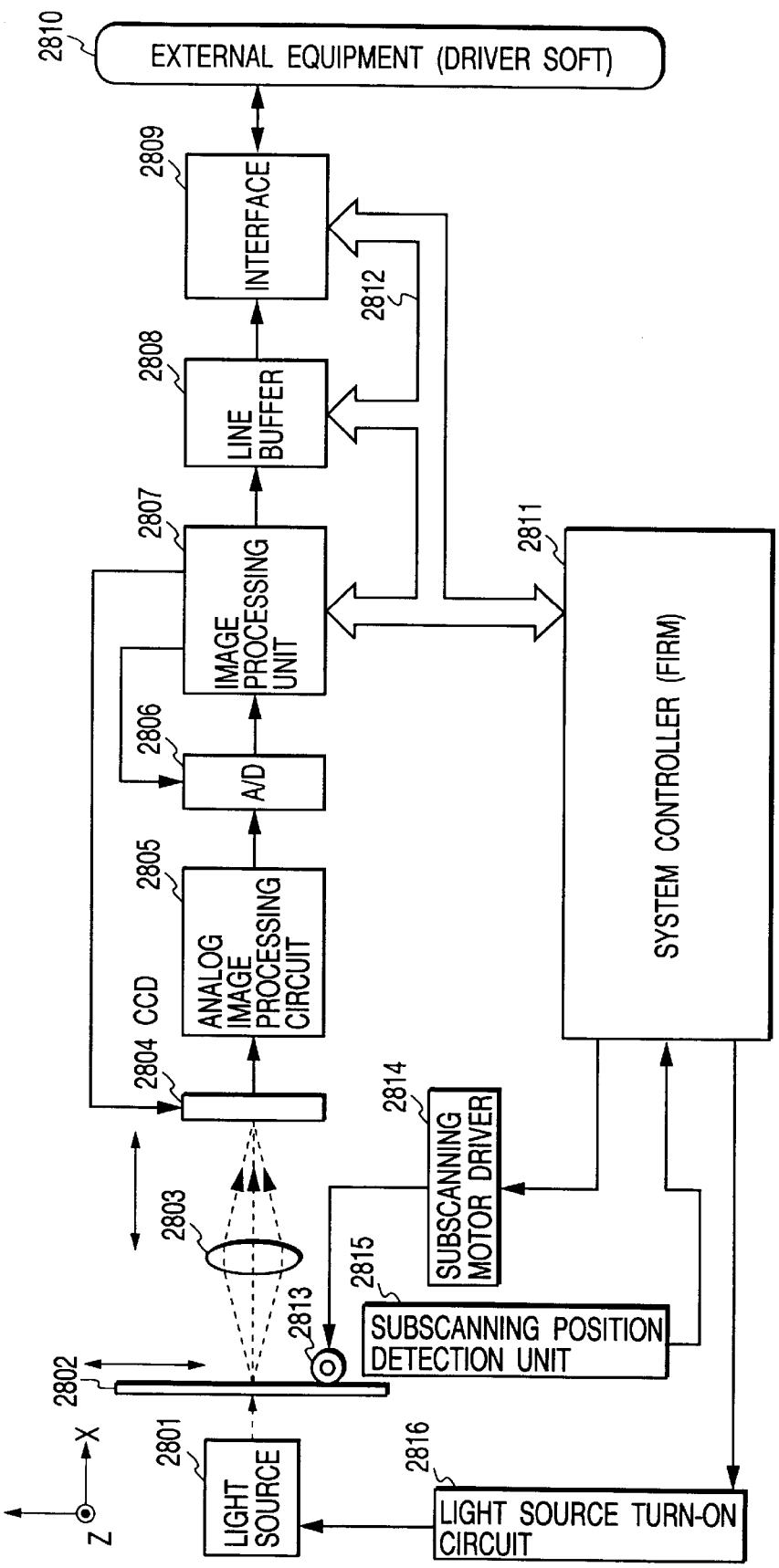
FIG. 28 is a block diagram showing the structure of a conventional film scanner.
Figure 29:
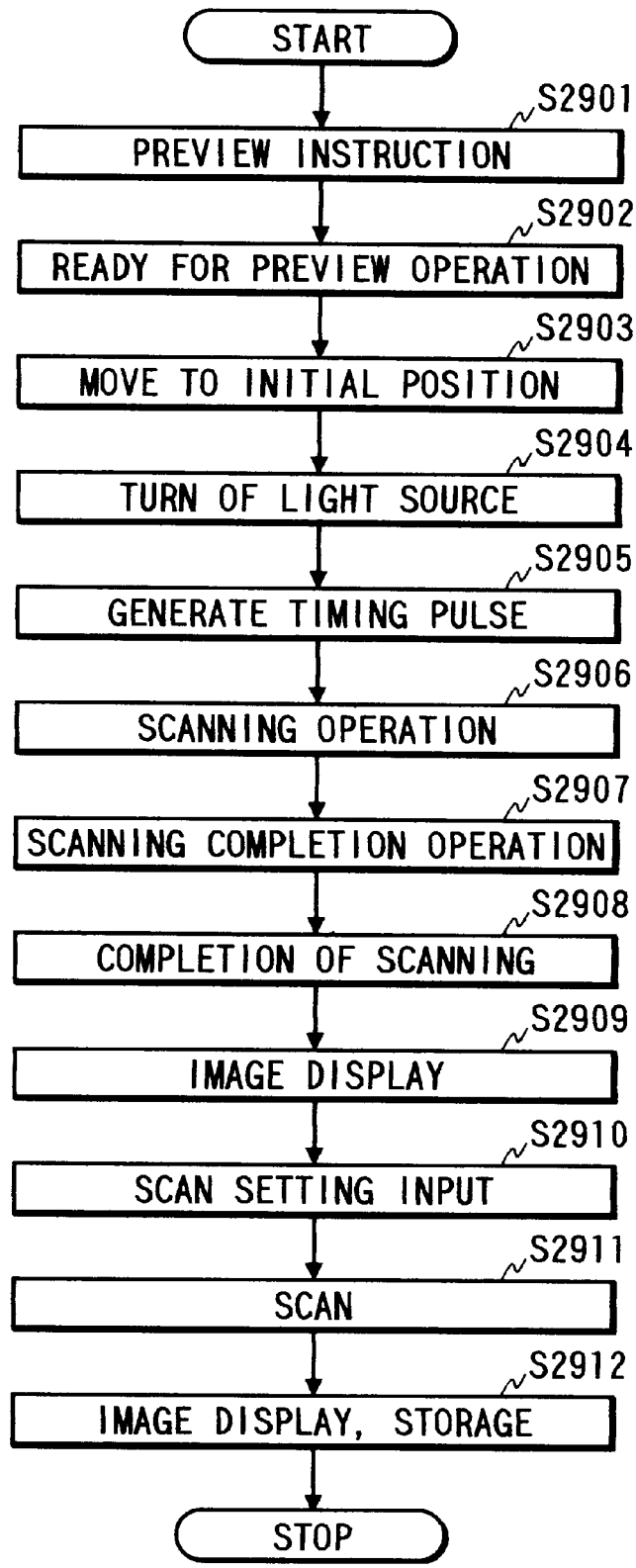
FIG. 29 is a flow chart illustrating the operation of a conventional film scanner.

The operation contents of the film type setting at Step S2110 are illustrated in FIG. 27.

At Step S2701 a film type, a negative film or positive film, is set. For the negative film, a group indicating a negative film base density, a 35 mm film, an APS film and the like are set. For each of these settings, the amplifier gain is set to a predetermined value.

At Step S2702 an exposure time is switched between negative and positive films, or an exposure time may be switched even for negative films having high density.

At Step S2703 a gamma correction table suitable for the film type set at Step S2701 is set to the offset RAM 122.

At Step S2704 a masking coefficient suitable for the film type set at Step S2701 is set.

At Step S2705 if the film type is the 35 mm film, a standard image read area is set, whereas if it is the APS film, an image read area corresponding to the photographing mode of the APS film is set.

At Step S2706 the film type setting is terminated.

The photographing mode of an APS film will be described. When a user takes a scene with a camera loaded with an APS film, one of three print sizes (or print types) of H, P and C is selected. This is called photographing mode setting. A reference print size is the H type (an aspect ratio of a height to a width is 9:16, also called a high vision size). The image area of the H type whose upper and lower portions are cut is the P type (an aspect of 1:3, also called a panorama size). The image area of the H type whose right and left portions are cut is the C type (an aspect ratio of 2:3, also called a Leica size). An image size set on the film surface is 16.7 mm (main scan direction)×30.2 mm (sub scan direction) corresponding to the H print size. In accordance with the magnetic information (frame information) on the photographing mode recorded on the film, an image area of 9.5 mm×30.2 mm is trimmed from the film image area of 16.7 mm×30.2 mm to form a P type image, and an image area of 16.7 mm×23.4 mm is trimmed to form a C type image. The aspect ratio is not limited only to the above ratios, but a user may set as desired an image position and an aspect ratio and record them on the film.

In the present embodiment, the magnetic information of the film is detected by the magnetic information detection unit (frame information detection unit) and the photographing mode of each frame of the film is discriminated in the system controller 111 to set an image read area of each frame of the film according to the photographing mode (one of H, P and C).

Specifically, the magnetic information is detected by magnetic information detection unit 119 by making use of movement of the film, caused during prescanning (however, any time will do as long as the film is moved in the subscanning direction before scanning). Subsequently, setting of a frame, performed after the detection of the magnetic information, will be explained by referring to FIG. 30. Reference numeral 3001 represents an image area of an APS film. When a linear image sensor is arranged in the longitudinal direction of the film, an output of the linear image sensor will be an image signal output such as an output 3002 shown in FIG. 30. In this case, when a photographing mode is discriminated as H and C according to the output of the magnetic information detection unit 119, a main scanning frame signal 3003 is selected, and when the photographing mode is P, then a main scanning frame signal 3004 is selected. By using the selected main scanning frame signal, only image signal of a "H" state is extracted, and then an image processing of one line is performed. This is easily attained by using the main scanning frame signal as a write enable signal of a temporary data storing RAM. Next, when the photographing mode is H or P type, a subscanning frame signal 3005 is selected, and when it is C type, a subscanning frame signal 3006 is selected. When the selected subscanning frame signal is "H", a subscanning motor is driven at predetermined scan speed, and when is "L", the subscanning motor is driven at the possible maximum speed to move the film holder. This driving of the subscanning motor is programed in advance. It may be possible to store the main scanning frame signal and the subscanning frame signal into a ROM of the CPU in advance. However, it may be also possible to read these signals from external equipment. In addition, the present invention apparently includes frame control with a desired range, which can be attained by linking trimming information from the external equipments with the main and subscanning frame signals.

In this embodiment, the image read area is set for each frame of the film. Since the speed of moving the film in the sub scan direction is set faster in the area outside the image read area than in the image read area, the image read time can be shortened if the film contains frames photographed by the C type mode. Specifically, the C type has a read area shorter by 6.8 mm in the sub scan direction than the H type. Therefore, the image read time for the C type is shorter than the H type. If the film contains C type frames, an image read time can be shortened if the type of each frame is judged and then read, as compared to the case wherein all frames are read by assuming that they are the H type.

As described earlier, the image read area is set for each frame of a film and image signals are processed only in this image read area in the main scan direction. Accordingly, if the film contains frames of the P type photographing mode, the process time can be shortened as compared to the case wherein image signals are processed by assuming that they are all of the H type.

If all frames are read as the H type, it is necessary to trim each frame in accordance with the photographing mode. In this embodiment, however, since the image read area is set for each frame in accordance with the photographing mode, the trimming works are not necessary.

The image on an APS film is shorter in the main scan direction than an image on a 35 mm film. Accordingly, signal processing in the image read area of the H type requires a shorter time than the 35 mm film.

As described so far, in the above embodiment, it is possible for the APS film to read an image in such a manner matching the photographing mode, to shorten the image read time, and to omit the trimming works.

As appreciated from the foregoing description of the invention, an image can be read in such a manner matching the photographing mode and trimming works can be omitted. In the above embodiment, although an APS film is used, the invention is applicable to other types of films so long as they can record frame information, trimming information, or framing information on each frame.

According to the invention, an image read time can be shortened or a signal processing time can be shortened.

Many widely different embodiments of the present invention may be constructed without departing from the spirit and scope of the present invention. It should be understood that the present invention is not limited to the specific embodiments described in the specification, except as defined in the appended claims.

What is claimed is:

1. A film scanner for projecting an image to be read onto a linear image sensor, performing electronic main scanning along a longitudinal direction of the linear image sensor and mechanical sub scan along a direction perpendicular to the longitudinal direction to read the film image through a relative motion between the film image and the linear image sensor and processing the film image, comprising:

frame information detection means for detecting frame information recorded on the film; and control means for controlling to change an image read area of the film in accordance with an output of said frame information detection means, wherein said control means performs the relative motion in an area outside of the image read area at a faster speed than in the image read area.

2. A film scanner according to claim 1, wherein the frame information is information magnetically recorded on the film.

3. A film scanner according to claim 1, wherein said control means controls to process image signals only in the image read area.

4. An image reading apparatus comprising:

(a) image reading means for reading an image formed on a film, said image reading means including a linear image sensor;

(b) detection means for detecting trimming information recorded on the film; and (c) limiting means for limiting an image read area to be read by said image reading means in accordance with an output from said detection means, wherein said limiting means changes a sub scan speed of the linear image sensor in accordance with an output. from said detection means.

5. An image reading apparatus according to claim 4, wherein the trimming information is information magnetically recorded on the film.

6. An image reading apparatus comprising:

(a) image reading means for reading an image formed on a film, said image reading means including a linear image sensor;

(b) detection means for detecting framing information recorded on the film; and (c) limiting means for limiting an image read, area to be read by said image reading means in accordance with an output from said detection means, wherein said limiting means changes a sub scan speed of the linear image sensor in accordance with an output from said detection means.

7. An image reading apparatus according to claim 6, wherein the framing information is information magnetically recorded on the film.

8. A storage method comprising the steps of:
(a) detecting trimming information recorded on a film by using detection means; and
(b) limiting an area of an image formed on the film to be read by image reading means, which includes a linear image sensor, in accordance with the trimming information detected by the detection means,
wherein in said limiting step, a sub scan speed of the linear image sensor is changed in accordance with the detected trimming information.

9. A storage method according to claim 8, wherein the trimming information is information magnetically recorded on the film.

10. An image reading apparatus comprising:
(a) image reading means for reading an image formed on a film;
(b) detection means for detecting trimming information recorded on the film; and
(c) limiting means for limiting a mechanical sub scan operation of said image reading means in accordance with an output from said detection means.

11. An image reading apparatus according to claim 10, wherein said image reading means includes a linear image sensor.

12. An image reading apparatus according to claim 11, wherein said limiting means changes a sub scan speed of the linear image sensor in accordance with an output from said detection means.

13. An image reading apparatus according to claim 10, wherein the trimming information is information magnetically recorded on the film.

14. An image reading apparatus comprising:
(a) image reading means for reading an image formed on a film;
(b) detection means for detecting framing information recorded on the film; and
(c) limiting means for limiting a mechanical sub scan operation of said image reading means in accordance with an output from said detection means.

15. An image reading apparatus according to claim 14, wherein said image reading means includes a linear image sensor.

16. An image reading apparatus according to claim 15, wherein said limiting means changes a sub scan speed of the linear image sensor in accordance with an output from said detection means.

17. An image reading apparatus according to claim 14, wherein the framing information is information magnetically recorded on the film.

18. A reading method comprising the steps of:
(a) detection trimming information recorded on a film by using detection means; and
(b) limiting a mechanical sub scan operation of image reading means in accordance with the detected trimming information.

19. A reading method according to claim 18, wherein the image reading means includes a linear image sensor.

20. A reading method according to claim 19, wherein in said limiting step, a sub scan speed of the linear image sensor is changed in accordance with an output from the detection means.

21. A reading method according to claim 18, wherein the trimming information is information magnetically recorded on the film.

22. A reading method comprising steps of:
(a) detecting frame information recorded on a film by using detection means; and
(b) limiting a mechanical sub scan operation of image reading means in accordance with the detected frame information.

23. A reading method according to claim 22, wherein the image reading means includes a linear image sensor.

24. A reading method according to claim 23, wherein in said limiting step, a sub scan speed of the linear image sensor is changed in accordance with an output from the detection means.

25. A reading method according to claim 22, wherein the frame information is information magnetically recorded on the film.

* * * * *

UNITED STATES PATENT AND TRADEMARK OFFICE
CERTIFICATE OF CORRECTION

PATENT NO.  : 6,100,960

DATED       : August 8, 2000

INVENTOR(S) : Hidekage Sato, et al.

It is certified that error appears in the above-identified patent and that said Letters Patent is hereby corrected as shown below:

<u>COLUMN 5</u>:

Line 15, "folder" should read --holder--.

Signed and Sealed this

Twenty-ninth Day of May, 2001

Attest:

NICHOLAS P. GODICI

Attesting Officer

Acting Director of the United States Patent and Trademark Office